(12) United States Patent
Bhat

(10) Patent No.: US 12,051,414 B2
(45) Date of Patent: *Jul. 30, 2024

(54) HEARING AID DEVICE WITH SPEECH CONTROL FUNCTIONALITY

(71) Applicant: Oticon A/S, Smørum (DK)

(72) Inventor: Vijay Kumar Bhat, Smørum (DK)

(73) Assignee: Oticon A/S, Smørum (DK)

( * ) Notice: Subject to any disclaimer, the term of this patent is extended or adjusted under 35 U.S.C. 154(b) by 103 days.

This patent is subject to a terminal disclaimer.

(21) Appl. No.: 17/669,756

(22) Filed: Feb. 11, 2022

(65) Prior Publication Data

US 2022/0165273 A1   May 26, 2022

Related U.S. Application Data

(60) Division of application No. 16/684,367, filed on Nov. 14, 2019, now Pat. No. 11,348,580, which is a
(Continued)

(30) Foreign Application Priority Data

Aug. 29, 2016   (EP) .................................... 16186153

(51) Int. Cl.
| | | |
|---|---|---|
| *G10L 15/22* | (2006.01) | |
| *G10L 13/00* | (2006.01) | |
| *H04R 25/00* | (2006.01) | |

(52) U.S. Cl.
CPC ............ *G10L 15/22* (2013.01); *H04R 25/554* (2013.01); *H04R 25/558* (2013.01); *G10L 13/00* (2013.01);
(Continued)

(58) Field of Classification Search
CPC ... G10L 15/22; G10L 13/00; G10L 2015/223; H04R 25/554; H04R 25/558;
(Continued)

(56) References Cited

U.S. PATENT DOCUMENTS

| | | |
|---|---|---|
| 4,887,299 A | 12/1989 | Cummins et al. |
| 4,918,736 A | 4/1990 | Bordewijk |

(Continued)

FOREIGN PATENT DOCUMENTS

| | | |
|---|---|---|
| CN | 203340255 U | 12/2013 |
| CN | 104902070 A | 9/2015 |

(Continued)

OTHER PUBLICATIONS

Cao, et al. "Research on Single-Channel Enhancement Algorithm for Hearing Aids"; China Academic Journal Electronic Publishing House; Journal of Signal Processing; vol. 30, No. 4; Apr. 2014; pp. 405-412.

(Continued)

*Primary Examiner* — Angelica M McKinney
(74) *Attorney, Agent, or Firm* — Birch, Stewart, Kolasch & Birch, LLP

(57) ABSTRACT

A hearing aid device for processing signals comprising audio in order to assist a hearing impaired user and being configured to be arranged at, behind and/or in an ear of the user is disclosed. The hearing aid device comprises at least one input transducer, an output transducer, an antenna, a wireless interface, and a signal processing unit. The at least one input transducer is adapted for receiving signals comprising audio. The output transducer is adapted for providing signals comprising audio to the user. The antenna is adapted for wirelessly communicating with a respective external device. The wireless interface is adapted for receiving and/or sending data via the antenna. The signal processing unit is adapted for processing signals comprising audio in order to assist a hearing impaired user. Furthermore the signal processing unit is adapted for extracting speech signals from the signals comprising audio and for generating control signals based on the speech signals. At least one of the control (Continued)

signals generated by the signal processing unit is adapted for controlling the respective external device. The wireless interface is adapted for sending the at least one of the control signals to the respective external device via the antenna in order to control the respective external device.

20 Claims, 8 Drawing Sheets

Related U.S. Application Data continuation of application No. 15/688,125, filed on Aug. 28, 2017, now Pat. No. 10,510,345.

(52) U.S. Cl.
CPC .... *G10L 2015/223* (2013.01); *H04R 2225/55* (2013.01)

(58) Field of Classification Search
CPC .................. H04R 2225/55; H04R 25/50; H04R 2225/43; H04R 25/552; H04R 25/505
See application file for complete search history.

(56) References Cited

U.S. PATENT DOCUMENTS

| | | | |
|---|---|---|---|
| 5,721,783 A | 2/1998 | Anderson | |
| 6,985,782 B1* | 1/2006 | Watanabe | G11B 31/00 348/460 |
| 7,162,421 B1 | 1/2007 | Zeppenfeld et al. | |
| 9,628,893 B2* | 4/2017 | Stevens | H04R 1/1041 |
| 9,808,623 B2 | 11/2017 | Riis et al. | |
| 10,204,618 B2 | 2/2019 | Dong et al. | |
| 10,405,051 B2 | 9/2019 | Murray | |
| 10,510,345 B2* | 12/2019 | Bhat | H04R 25/558 |
| 11,348,580 B2* | 5/2022 | Bhat | H04R 25/558 |
| 2008/0037727 A1 | 2/2008 | Sivertsen et al. | |
| 2008/0154610 A1 | 6/2008 | Mahlbacher | |
| 2010/0128907 A1* | 5/2010 | Dijkstra | H04R 25/552 381/315 |
| 2011/0004468 A1 | 1/2011 | Fusakawa et al. | |
| 2013/0169525 A1 | 7/2013 | Han et al. | |
| 2014/0023217 A1* | 1/2014 | Zhang | H04R 25/505 381/315 |
| 2015/0163602 A1 | 6/2015 | Pedersen et al. | |
| 2015/0287408 A1 | 10/2015 | Svendsen et al. | |
| 2016/0049074 A1* | 2/2016 | Shennib | H04R 25/558 381/23.1 |
| 2016/0331964 A1 | 11/2016 | Xiao et al. | |
| 2017/0069321 A1 | 3/2017 | Toiyama | |
| 2018/0124526 A1 | 5/2018 | Solum et al. | |
| 2020/0092665 A1 | 3/2020 | Roeck | |
| 2020/0312303 A1 | 10/2020 | Roeck | |
| 2020/0314525 A1 | 10/2020 | Thielen | |

FOREIGN PATENT DOCUMENTS

| | | |
|---|---|---|
| EP | 1596362 A1 | 11/2005 |
| EP | 2381702 A2 | 10/2011 |
| WO | WO 99/03254 A1 | 1/1999 |
| WO | WO 2010/019634 A2 | 2/2010 |

OTHER PUBLICATIONS

Jiang et al. "Confidence measures for speech recognition: A survey", Speech Communication, Elsevier Science Publishers, Amsterdam, NL, vol. 45, No. 4, Apr. 1, 2005, pp. 455-470.

Y.A. Alsaka, et al. "Portable Speech Recognition for the Speech and Hearing Impaired", University of North Florida, Jacksonville, Florida; 1997 IEEE; pp. 151-153.

* cited by examiner

HEARING AID DEVICE WITH SPEECH CONTROL FUNCTIONALITY

CROSS-REFERENCE TO RELATED APPLICATIONS

This application is a Divisional of copending U.S. patent application Ser. No. 16/684,367 filed on Nov. 14, 2019, which is a Continuation of U.S. patent application Ser. No. 15/688,125 filed on Aug. 28, 2017 (now U.S. Pat. No. 10,510,345 issued Dec. 17, 2019), which claims priority under 35 U.S.C. § 119(a) to Application No. 16186153.9, filed in Europe on Aug. 29, 2016, all of which are hereby expressly incorporated by reference into the present application.

FIELD

The present disclosure relates to a hearing aid device for assisting a hearing impaired user. More particularly, the disclosure relates to a hearing aid device that is adapted to control external devices by speech control. The present disclosure furthermore relates to a hearing system comprising a hearing aid device and an external device. The present disclosure further relates to a method for a wireless receiving and/or sending of data from a hearing aid device to an external device in order to control the external device via the hearing aid device.

BACKGROUND

Hearing aid devices typically comprise at least a microphone, a speaker, and electric circuitry. The electric circuitry commonly comprises a signal processing unit for processing signals received by the microphone. The electric circuitry can furthermore comprise a wireless interface connected to an antenna. Nowadays hearing aid devices can comprise such an antenna for communicating wirelessly with external devices. The most common use of the antenna is to communicate wirelessly with another hearing aid device in order to allow a user to use two hearing aid devices as a binaural hearing aid system.

It is known to use wireless technology standards for exchanging data over short distances by using short-wavelength radio transmissions, such as Bluetooth applying the ISM band from 2400-2800 MHz.

Many devices that use wireless connection technologies like Bluetooth devices, however, do not have audio capabilities, i.e., they cannot be controlled by speech. Furthermore common Bluetooth headsets often cannot be used by hearing aid device users as the speaker of the Bluetooth headset and the microphone of the hearing aid device cannot be arranged in a manner that allows for a high signal-to-noise level.

Therefore, there is a need to provide a solution that allows hearing aid devices to control Bluetooth devices by speech.

SUMMARY

According to an aspect, a hearing aid device comprises at least one input transducer, an output transducer, an antenna, a wireless interface, and a signal processing unit. The hearing aid device is adapted for processing signals comprising audio in order to assist a hearing impaired user and is further configured to be arranged at, behind and/or in an ear of the user. The at least one input transducer is adapted for receiving signals comprising audio. The output transducer is adapted for providing signals comprising audio to the user. The antenna is adapted for wirelessly communicating with a respective external device. The wireless interface is adapted for receiving and/or sending data via the antenna. The signal processing unit is adapted for processing signals comprising audio in order to assist a hearing impaired user. Furthermore the signal processing unit is adapted for extracting speech signals from the signals comprising audio and for generating control signals based on the speech signals. At least one of the control signals generated by the signal processing unit is adapted for controlling the respective external device preferably without having an audio receiving capability. The wireless interface is adapted for sending the at least one of the control signals that is adapted for controlling the respective external device to the respective external device via the antenna in order to control the respective external device.

The input transducer can for example be a microphone, a microphone array or the like. The output transducer can for example be a speaker, receiver, mechanical vibrator, an electrode array of a cochlear implant or any other kind of output transducer. The signal processing unit is adapted to process signals comprising audio which can be received by the input transducer or via the wireless interface and antenna. The signals comprising audio received via the wireless interface and antenna can for example be data received from a respective external device, e.g., another hearing aid device, a Smart Phone, a mobile phone, a tablet computer, a personal computer, a sound system, a Smart television, a music system, a gaming system, or any other external device that can be connected wirelessly to the hearing aid device. The signal processing unit can for example comprise a digital signal processor (DSP) that is adapted to process the signals comprising audio by methods commonly used for hearing aid devices, e.g., frequency filtering, frequency dependent gain, compression, amplification of predetermined frequencies or frequency bands, noise reduction, or the like in order to assist a hearing impaired user.

The signal processing unit furthermore is adapted for extracting speech signals from the signals comprising audio. The signal processing unit is preferably adapted to analyse or interpret the speech signals extracted from the signals comprising audio and to generate corresponding control signals. Various methods can be implemented in order to analyse or interpret the extracted speech signals in the signal processing unit. In order to generate such control signals the speech signals are preferably analysed or interpreted in the signal processing unit based on a Hidden Markov Model, a rule based analysis model, a table assigning speech signals to predetermined control signals or any other method that allows analysing or interpreting speech signals in order to generate control signals. The signal processing unit can for example be adapted to use the extracted speech signal along with a set of attributes as input for a rule based analysis model to determine which control signal is to be generated. The control signal can also for example be selected from a table of predetermined control signals associated to predetermined speech signals. The control signals are preferably either commands or a notification that the speech signal could not be associated with high enough confidence to a certain command. Commands are to be understood as control signals that are adapted to control a respective external device or the hearing aid device, i.e., turning on or off the device, changing a mode of operation, increasing or decreasing the sound level, or the like. A notification is to be understood as a control signal that is adapted to cause the hearing aid device to notify the user that for example a command could not be generated from the extracted speech signal. Commands can also be adapted to additionally cause the hearing aid device to notify the user that the command has been understood and is performed when the command is executed on the hearing aid device. Alternatively or additionally a status update can be received from the respective external device controlled by the command when the command is executed on the respective external device. The status update can be provided to the output transducer in the form of a signal comprising audio in order to present it to the user. One of the control signals can for example be a signal that controls the hearing aid device itself, e.g., the control signal can cause an increase or decrease of the sound level of the hearing aid device, which allows the user to control the hearing aid device using speech control. At least one of the control signals that can be generated by the signal processing unit based on the speech signals is a control signal that is adapted for controlling a respective external device. The control signal can be transmitted to the respective external device via the wireless interface and the antenna. In this way respective external devices can be controlled by the hearing aid device. Data sent by the external device can be received via the antenna and wireless interface of the hearing aid device. This allows for example to receive status updates such as a temperature measurement by a respective external device such as from a temperature sensor.

The hearing aid device according to the disclosure allows for speech control of external devices such as Bluetooth devices using the hearing aid device. The hearing aid device furthermore allows for controlling external devices that have audio capabilities but which cannot be used by users of conventional hearing aid devices, as the hearing aid devices and external devices cannot be arranged in a manner that allows a high signal-to-noise level. In particular the hearing aid user may not be able to send speech signals to the external device and receive signals from the device at his ears with high enough fidelity. The hearing aid device can even be used to control external devices that do not have audio capabilities and cannot be controlled by speech on their own. The hearing aid device allows for hands free operation of external devices. The hearing aid device furthermore allows for controlling external devices without the need to use a visual display of the external device. Hence the user may take his eyes off a visual display of the external device and use speech control in order to operate the external device. The hearing aid device further allows for using several external devices simultaneously. Hence the hearing aid device serves as a central device which can be connected wirelessly with external devices in order to operate the external devices by the hearing aid device. Therefore the hearing aid device allows for avoiding additional external devices, as the hearing aid device comprises additional speech control functionality which allows to control external devices by speech, e.g., by a speech command that is adapted to control only a specific external device and is ignored by other external devices.

According to another aspect, a hearing system comprises a hearing aid device according to the disclosure and an external device. The external device comprises an antenna and a wireless interface. The antenna is adapted for wirelessly communicating with the hearing aid device. The wireless interface is adapted for receiving and/or sending data via the antenna.

The hearing system according to the disclosure allows for speech control of the external device using the hearing aid device. In particular the external device can be a hearing aid device. This allows for forming a binaural hearing aid system that can be controlled by speech signals of the user. The external device can also for example be a mobile phone, a Smart Phone, a tablet computer, a personal computer, a sound system, a Smart television, a Bluetooth temperature sensor, a music system, a gaming system, or any other external device that can be connected wirelessly to the hearing aid device. Typically the external device lacking audio receiving capabilities may benefit from the disclosed hearing aid device having control functionality. This allows for using the hearing aid device as central device for controlling external devices in everyday life of the hearing impaired user. For example the hearing aid device user can use a Smart television or tablet computer to watch movies while the hearing aid device is used as remote control to control the external devices by speech control. At the same time the hearing aid device can be used as hearing aid assisting the hearing and that allows for receiving signals comprising audio wirelessly via the wireless interface and antenna or via the input transducer from the external device.

According to yet another aspect, a method for a wireless receiving and/or sending of data from a hearing aid device to an external device in order to control the external device via the hearing aid device is provided. The method comprises the following steps: A step of receiving signals comprising audio at the hearing aid device, a step of extracting speech signals from the signals comprising audio, a step of analysing the extracted speech signals by speech recognition and generating control signals from the extracted speech signals. The control signals generated from the extracted speech signals are adapted for controlling the external device. The method further comprises a step of providing the control signals to the external device in order to control the external device.

The method for a wireless receiving and/or sending of data from a hearing aid device to an external device in order to control the external device via the hearing aid device according to the disclosure allows for a convenient method for controlling external devices for hearing impaired users. Further the method allows for hands free operation of the external device. Furthermore the method allows for controlling external devices without the need to use a visual display of the external device. Hence the user may take his eyes off a visual display of the external device and use speech control in order to operate the external device. The method can also be used in order to control several external devices simultaneously.

According to another aspect the hearing aid device according to the disclosure is used.

Preferably the hearing aid device is used in order to wirelessly send control signals to a respective external device and/or receive data from a respective external device. Control signals can be sent from the hearing aid device to a respective external device and data can be received at the hearing aid device from a respective external device. Sending and receiving can be performed simultaneously or the hearing aid device can only send a control signal or only receive data at a given time. The hearing aid device can also receive data from more than one external device or send control signals to more than one external device. This allows for controlling external devices by using the hearing aid device. The user can use the hearing aid device without his hands and can thus also operate the external devices without the need to use his hands. Furthermore the hearing aid device can also be used without the need to look at a visual display of the external device.

According to yet another aspect the hearing aid device according to the disclosure is used in order to wirelessly communicate between the hearing aid device and the external device of the hearing system. This allows for using the hearing aid device of the hearing system in order to control the hearing system and in particular the external device of the hearing system.

According to one embodiment of the hearing aid device the signal processing unit is adapted to determine whether the signals comprising audio originate from the user. The signal processing unit preferably comprises a speech engine. The speech engine is preferably adapted to determine whether the signals comprising audio originate from the user. Preferably the hearing aid device comprises at least two input transducers, e.g., two microphones or an input transducer comprising for example a microphone array that can be used to determine whether the signals comprising audio originate from the user. The signal processing unit is preferably configured to determine whether the signals comprising audio originate from the user by comparing the signals and/or parameters derived from the signals received at the input transducers, e.g., microphones. In particular the speech engine can be adapted to compare the signals and/or parameters derived from the signals received at the input transducers. One preferred parameter derived from the signals is the sound level. Hence the signal processing unit, particularly the speech engine is preferably configured to compare the sound levels of the signals received at the input transducers, e.g., microphones. In particular the signal processing unit, particularly the speech engine can be used to determine whether the signals comprising audio originate from the user by comparing the difference in intensity of the signals comprising audio at each of the two input transducers, e.g., microphones. Due to the inverse distance law of sound the difference in intensity of the signals originating from a sound source far away from the input transducers is low while it is significant for sound sources close to the input transducers. The mouth of the user is close to the input transducers, i.e., it is a sound source close to the input transducers. Hence setting an adequate threshold value for the difference in intensity of the signals allows to determine whether the signals comprising audio originate from the user. Other techniques for determining whether signals comprising audio originate from the user or techniques for own voice detection are known to the person skilled in the art and can be used as well. The signal processing unit being adapted to determine whether the signals comprising audio originate from the user allows for avoiding unintentional triggering of the generation of control signals. Conventional speech-based systems suffer from unintentional speech inputs of surrounding persons which can be avoided using the hearing aid device with the signal processing unit adapted to determine whether the signal comprising audio originates from the user. Furthermore this allows for an improved own voice detection.

Preferably the signal processing unit is adapted to extract speech signals from the signals comprising audio and to generate control signals based on the speech signals only if the signals comprising audio originate from the user. The extracted speech signals are preferably analysed or interpreted and the signal processing unit is preferably adapted to determine a control confidence level if the signals comprising audio originate from the user. The control confidence level preferably corresponds to a probability value that the extracted speech signal corresponds to a predetermined speech signal associated to a predetermined control signal. The signal processing unit is preferably adapted to generate a control signal only if the control confidence level of the determination is above a predetermined lower threshold control confidence level. Hence the control confidence level determines whether a control signal is generated or not. Whether a command or notification is generated preferably depends on whether the control confidence level of the determination is above a predetermined higher threshold control confidence level. Therefore if the determined control confidence level is above the lower threshold control confidence level and below the higher threshold control confidence level, a notification will be generated. This notification is presented to the user via the output transducer as sound in order to notify the user that the speech signal could not be associated to a command. The notification may be amplified to amplify the sound to compensate for the hearing loss of the user. If the control confidence level of the determination is above the higher threshold control confidence level a control signal in the form of the command associated to the speech signal is generated. This command is either used for controlling the hearing aid device or it is transmitted to the respective external device in order to control the respective external device. The threshold control confidence levels are preferably predetermined for respective external devices. The threshold control confidence levels can also for example be set by a user, e.g., during a fitting session, continuous learning of the hearing aid device, manually, or any other method known to the person skilled in the art. Furthermore the threshold control confidence level can also be location and/or time dependent, e.g., depending on the sound environment, the time of the day, the coordinates of the user, or the like. For example the control confidence level can be different in a home environment and an office environment.

This allows for avoiding the generation of control signals that might disturb the user of the hearing aid device. Furthermore unintentional triggering of analysis or interpretation of extracted speech signals by the signal processing unit can be avoided. Further if the signal processing unit has to analyse or interpret speech signals in fewer cases it is possible to lower the energy consumption of the hearing aid device.

The hearing aid device preferably comprises a memory. The memory preferably stores at least one of i) at least one parameter associated with the user, ii) at least one parameter associated with predetermined user environments, or iii) at least one parameter associated with predetermined external devices. The parameter is preferably used to improve the determination whether the signals comprising audio originate from the user. The parameter additionally or alternatively can be adapted to improve analysing or interpreting the speech signal in the signal processing unit. Furthermore one parameter can be adapted to improve the determination whether the signals comprising audio originate from the user and another parameter can be adapted to improve analysing or interpreting the speech signal in the signal processing unit. The parameters can be command attributes in the user's voice that may include temporal information, spectral information and/or filter coefficients. The parameters can also for example be threshold control confidence levels for predetermined external devices. The parameters can further be threshold confidence levels for predetermined user environments, e.g., noisy environment, silent environment or the like. This allows for improving the determination whether the signals comprising audio originate from the user. Furthermore the analysis or interpretation of the extracted speech signals in order to generate control signals can be improved.

The signal processing unit can comprise an analog-digital-converter (ADC) and a digital-analog-converter (DAC). The analog-digital-converter (ADC) is preferably adapted for digitizing the signals comprising audio into digital signals. The digital-analog-converter (DAC) is preferably adapted for converting digital signals to analog signals. The signal processing unit is preferably adapted to process digital signals. After processing of a digital signal in the signal processing unit, it can be converted to an analog signal using the digital-analog-converter in order to supply the analog signal to the output transducer. Furthermore digital signals received by the hearing aid device by the wireless interface can be processed by the signal processing unit. These signals can also be provided to the digital-analog-converter in order to be provided to the output transducer as analog signals. This allows for receiving analog signals via the input transducers and digital signals via the antenna and wireless interface. Both signals can be processed in the hearing aid device and provided to the hearing impaired user in order to assist the hearing of the user.

According to another embodiment of the hearing aid device the signal processing unit is adapted for converting data received via the wireless interface and/or control signals into signals comprising audio in order to be presented to the user via the output transducer. The data can for example comprise signals comprising audio in encoded form which can be decoded by the signal processing unit. The control signals can for example be associated to a predetermined signal comprising audio which can be provided to the output transducer, e.g., a status message, notification, speech signal, or the like. This allows for receiving data and signals from external devices that can be provided to the user as sound via the output transducer.

According to yet another embodiment of the hearing aid device the signal processing unit comprises a speech synthesis unit. The speech synthesis unit is preferably adapted to convert data received via the wireless interface and/or control signals into speech signals using speech synthesis. The speech signals are intended to be presented to the user via the output transducer. For example the hearing aid device can receive status updates from the external devices or other data, e.g., a speech signal or any other signal comprising audio. If the external device is for example a mobile phone the received signals comprising audio can be signals transmitted via the public telephone network. This allows for using the hearing aid device similar to a Bluetooth headset connected wirelessly to a mobile phone, however, the hearing aid device has additional hearing aid functions that improve the hearing of the hearing impaired user.

According to another embodiment of the hearing aid device the signal processing unit is adapted to determine a confidence level based on the signal comprising audio. The confidence level preferably corresponds to a likelihood of the signal comprising audio to be originating from the user of the hearing aid device. The confidence level can also be the control confidence level which corresponds to a likelihood of the signal comprising audio to correspond to a speech signal associated with a predetermined control signal. Preferably the signal processing unit is adapted to process the signal according to the confidence level. The signal processing unit is preferably adapted to process the signal comprising audio in order to assist the hearing of the user if the determined confidence level is below a lower threshold confidence level. Hence the user will not be disturbed by the speech control functionality in most cases a signal comprising audio is received, e.g., if the user is listening to a conversation with other persons or speaking to the persons and does not want unintentional triggering of the speech control functionality of the hearing aid device. It is therefore important to set the lower threshold confidence level to a reasonable level. Preferably the signal processing unit is adapted to generate a control signal if the confidence level is equal to or above the lower threshold confidence level. The signal processing unit is preferably adapted to generate a control signal that causes the hearing aid device to notify the user, i.e., providing a notification via the output transducer if the confidence level is above or equal to the lower threshold confidence level but below a higher threshold confidence level. Such a control signal for example serves as notification signal in order to notify the user that it could not be determined whether the signals comprising audio originate from the user. Such control signal can also for example serve as notification signal in order to notify the user that a speech signal could not be analysed or interpreted by the signal processing unit in order to associate the speech signal to a command. The processing unit may be configured to amplify the notification signal to produce an amplified sound to compensate for the hearing loss of the user. The signal processing unit is preferably adapted to extract a speech signal from the signal comprising audio if the confidence level is equal to or above the higher threshold confidence level. If the control confidence level is equal to or above the higher threshold control confidence level the signal processing unit is preferably adapted to generate a control signal adapted for controlling a respective external device or the hearing aid device, i.e., a command. Processing the signal according to the confidence level allows for using the signal processing unit in different processing modes for different signal types. For example signals comprising audio that are received by the microphone and are not speech signals from the user can be processed in order to improve the hearing of the hearing impaired user of the hearing aid device. Signals that comprise speech of the user can be processed in order to generate control signals, can be ignored or can be processed in order to improve the hearing of the hearing impaired user. Furthermore signals that comprise speech of the user and are additionally interpreted to be speech signals associated with a predetermined control signal can be processed in order to generate the predetermined control signals.

Not all speech signals of the user have to be processed in order to generate control signals, as the user will commonly speak to other people. In cases when the user speaks to other people and does not want to control external devices or the hearing aid device by speech control the hearing aid device should not interact with the user. Therefore either a reasonable lower threshold confidence level can be set or the hearing aid device can comprise a switch adapted for activating and/or deactivating the speech control functionality. The speech control functionality of the hearing aid devices comprises the function of the signal processing unit to extract speech signals and to generate control signals based on the extracted speech signals. The speech control functionality therefore essentially allows for using speech signals of the user in order to control the hearing aid device and respective external devices connected wirelessly to the hearing aid device. Hence if the speech control functionality is deactivated, the hearing aid device essentially operates as a common hearing aid device with a wireless interface and antenna that can receive signals via the input transducer from the environment and wirelessly via the wireless interface and the antenna. Alternatively or additionally the speech control functionality can also be activated and/or deactivated by a predetermined speech signal. Preferably such a speech signal is not a common word used in conversations in order to avoid unintentional activation and/or deactivation of the speech control functionality.

The wireless interface is preferably adapted for receiving and/or sending data by means of radio frequency signals in the frequency range of 1 MHz to 100 GHz, such as 300 MHz to 3 GHz, such as 2 GHz to 2.5 GHz, such as 2400 MHz to 2483.5 MHz, such as in the frequency range of 1 MHz to 200 MHz, such as 200 MHz to 400 MHz, such as 400 MHz to 800 MHz, such as 800 MHz to 1500 MHz, such as 1500 MHz to 1800 MHz, such as 1800 MHz to 2100 MHz, such as 2100 MHz to 2200 MHz, such as 2200 MHz to 2400 MHz, such as 2400 MHz to 2500 MHz, such as 2500 MHz to 2800 MHz, such as 2800 MHz to 3000 MHz, such as around 2.4 GHz. Most preferably the wireless interface is adapted for receiving and/or sending data according to a communication standard, such as Bluetooth. This allows for good compatibility with common external devices.

According to another embodiment of the hearing aid device the signal processing unit comprises a speech analysis unit. The speech analysis unit is preferably adapted to recognize predetermined speech signals in the signals comprising audio. The signal processing unit can further be adapted to generate predetermined control signals based on the predetermined speech signals. The signal processing unit can therefore comprise a table that associates predetermined speech signals with predetermined control signals. The table that associates predetermined speech signals with predetermined control signals can also be stored in the memory of the hearing aid device. This allows for a simple implementation of the speech control functionality.

The signal processing unit is preferably adapted for activating the wireless interface upon recognizing a predetermined speech signal in the signals comprising audio. Preferably the wireless interface is adapted to establish a connection to a predetermined external device in dependence of the specific predetermined speech signals recognized by the speech analysis unit upon activation. This allows for a convenient operation of the hearing aid device. The wireless interface can stay in a stand-by-modus until it is needed. The wireless interface is automatically activated upon receiving a predetermined speech signal and a connection to the predetermined external device is established.

According to an embodiment of the hearing system the external device is adapted to perform predetermined functions upon receiving the at least one of the control signals from the hearing aid device. This allows for controlling the external device and the functions of the external device.

According to another embodiment of the hearing system the external device comprises at least one sensor adapted to determine a sensor value. Preferably the external device is adapted to provide the sensor value of the predetermined sensor to the hearing aid device as data via the antenna of the external device upon receiving a predetermined control signal from the hearing aid device. This allows for receiving sensor information from external devices in the hearing aid device. The sensor information can be provided to the user via the output transducer in the form of a signal comprising audio. Therefore the hearing aid device can be used as a central device with other devices that are adapted to be connected wirelessly to the hearing aid device. The hearing aid device can control the external devices and receive information from the external devices, such as temperature, time, humidity, distance, pressure, news, technical details, or any other information.

According to one embodiment of the method the step of analysing the extracted speech signals by speech recognition comprises determining whether the speech signals originate from the user. Preferably control signals are only generated if the speech signals originate from the user. This allows for avoiding unintentional generation of control signals, e.g., by other people than the user that for example are in conversation with the user.

Preferably the method further comprises the following steps: A step of receiving data from the external device at the hearing aid device, a step of extracting signals comprising audio from the data, and a step of providing the signals comprising audio to a user. This allows for a second path for signals to be provided to the user, i.e., receiving signals wirelessly.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figure 1:
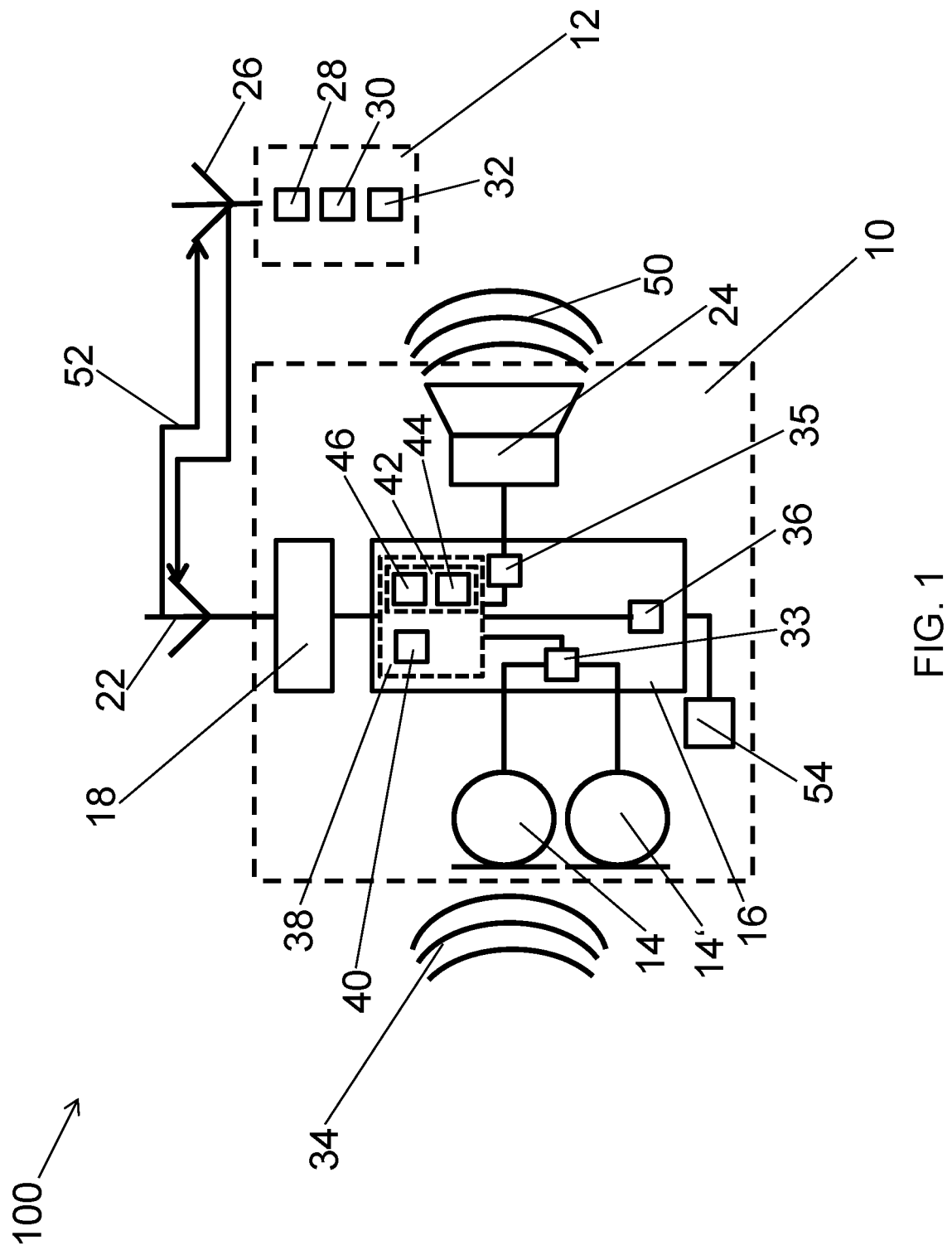
FIG. 1 illustrates a hearing aid device according to a first embodiment of the disclosure connected to an external device which together form a hearing system according to a first embodiment of the disclosure.

The detailed description set forth below in connection with the appended drawings is intended as a description of various configurations. The detailed description includes specific details for the purpose of providing a thorough understanding of various concepts. However, it will be apparent to those skilled in the art that these concepts may be practised without these specific details. Several aspects of the apparatus, i.e. the hearing aid device and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A hearing aid device includes a hearing aid that is adapted to improve or augment the hearing capability of a user by receiving an acoustic signal from a user's surroundings, generating a corresponding audio signal, i.e., a signal comprising audio, possibly modifying the audio signal and providing the possibly modified audio signal as an audible signal to at least one of the user's ears. The hearing aid device may further be adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of middle ear of the user or electric signals transferred directly or indirectly to cochlear nerve and/or to auditory cortex of the user.

The hearing aid device is adapted to be worn in any known way. This may include i) arranging a unit of the hearing aid device behind the ear with a tube leading air-borne acoustic signals into the ear canal or with a receiver/loudspeaker arranged close to or in the ear canal such as in a Behind-the-Ear type hearing aid, and/or ii) arranging the hearing aid device entirely or partly in the pinna and/or in the ear canal of the user such as in a In-the-Ear type hearing aid or In-the-Canal/Completely-in-Canal type hearing aid, or iii) arranging a unit of the hearing aid device attached to a fixture implanted into the skull bone such as in Bone Anchored Hearing Aid or Cochlear Implant, or iv) arranging a unit of the hearing aid device as an entirely or partly implanted unit such as in Bone Anchored Hearing Aid or Cochlear Implant.

A "hearing system" refers to a system comprising one or two hearing aid devices, and a "binaural hearing system" refers to a system comprising two hearing aid devices where the devices are adapted to cooperatively provide audible signals to both of the user's ears. The hearing system or binaural hearing system may further include auxiliary device(s) or external device(s), respectively that communicates with at least one hearing aid device, the auxiliary device or external device affecting the operation of the hearing aid devices and/or benefitting from the functioning of the hearing aid devices. A wireless communication link between the at least one hearing aid device and the auxiliary device or external device is established that allows for exchanging information (e.g. control and status signals, possibly audio signals) between the at least one hearing aid device and the auxiliary device or external device. Such auxiliary devices or external devices may include at least one of remote controls, remote microphones, audio gateway devices, mobile phones, public-address systems, car audio systems, sound systems, music systems, Smart Phones, Smart televisions, televisions (TV), laptop computers, tablet computers, personal computers, or music players or a combination thereof. The audio gateway is adapted to receive a multitude of audio signals such as from an entertainment device like a TV or a music player, a telephone apparatus like a mobile telephone or a computer, a PC. The audio gateway is further adapted to select and/or combine an appropriate one of the received audio signals (or combination of signals) for transmission to the at least one hearing aid device.

In general, a hearing aid device includes i) an input unit, e.g., an input transducer such as a microphone for receiving an acoustic signal from a user's surroundings and providing a corresponding input audio signal, and/or ii) a receiving unit for electronically receiving an input audio signal. The hearing aid device further includes a signal processing unit for processing the input audio signal and an output unit for providing an audible signal to the user in dependence on the processed audio signal.

The input unit, e.g., one or more input transducers may include multiple input microphones, e.g. for providing direction-dependent audio signal processing. Such directional microphone system is adapted to enhance a target acoustic source among a multitude of acoustic sources in the user's environment. In one aspect, the directional system is adapted to detect (such as adaptively detect) from which direction a particular part of the microphone signal originates. This may be achieved by using conventionally known methods. The signal processing unit may include an amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing aid devices, the output unit may include one or more output electrodes for providing the electric signals such as in a Cochlear Implant.

Now we refer to FIG. 1 which illustrates a hearing aid device 10 according to an aspect of the disclosure. The hearing aid device 10 is adapted for processing signals comprising audio in order to assist a hearing impaired user. The hearing aid device 10 is wirelessly connected to an external device 12 forming a hearing system 100 according to an aspect of the disclosure. Therefore, the hearing aid device 10 has additional functionality, in particular the hearing aid device 10 can be used to perform speech control of external devices 12.

The hearing aid device 10 comprises a first microphone 14, a second microphone 14', electric circuitry 16, a wireless interface 18, an antenna 22, and a speaker 24.

The external device 12 comprises an antenna 26, a wireless interface 28, a sensor 30, and may further include an interface to a further network 32.

The electric circuitry 16 of the hearing aid device 10 comprises an analog-digital-converter (ADC) 33, a digital-analog-converter (DAC) 35, a memory 36 and a signal processing unit 38. The signal processing unit 38 comprises a digital signal processor (DSP) 40 and a speech engine 42. The speech engine 42 comprises a speech analysis unit 44 and a speech synthesis unit 46. Besides the aforementioned components the hearing aid device 10 can further comprise one or more processing units common in hearing aid devices, such as a spectral filter bank for dividing signals in frequency bands, an analysis filter bank, amplifiers, a sound signal combination unit or other common processing units used in hearing aid devices (not shown). The hearing aid device 10 furthermore comprises a power source, e.g., a battery (not shown). The hearing aid device is adapted to be arranged at, in and/or behind an ear 47 of a hearing impaired user 48 (cf. FIG. 2).

The microphones 14 and 14' are adapted for receiving signals comprising audio. The wireless interface 18 is adapted for receiving and sending data via the antenna 22. The antenna 22 is adapted for wirelessly communicating with respective external devices 12.

The speaker 24 is adapted for providing signals comprising audio to the user 48, i.e., providing an output sound 50 to the user 48.

The hearing aid device 10 can run several modes of operation, e.g., a hearing aid mode, a speech control mode, a wireless receiving mode, a communication mode, or other modes of operation that are supported by the components of the hearing aid device 10. The modes of operation can be run in parallel or serially on the hearing aid device 10, e.g., the hearing aid mode and the wireless receiving mode can be run on the hearing aid device 10 at the same time.

In the hearing aid mode the hearing aid device 10 can be used as an ordinary hearing aid, e.g., in a normal listening mode, in which the listening quality is optimized or at least improved for a hearing impaired user 48.

The hearing aid device 10 in the hearing aid mode receives incoming sound 34 by the microphones 14 and 14' which generate signals comprising audio from the incoming sound 34. The incoming sound 34 are acoustic signals comprising audio and the microphones 14 and 14' generate electric signals from them. The signals comprising audio are provided to the analog-digital-converter 33 of the electric circuitry 16 which digitizes the signal. The digital signal is provided to the signal processing unit 38. The signal processing unit 38 is adapted for processing signals comprising audio in order to assist the hearing impaired user 48. Therefore the digital signal processor 40 (DSP) of the signal processing unit 38 processes the signals comprising audio by, e.g., amplification, noise reduction, spatial directionality selection, sound source localization, gain reduction/enhancement, frequency filtering, and/or other processing operations common for hearing aids. The processed signal is provided to the digital-analog-converter (DAC) 35 which converts the processed digital signal to an analog signal. The analog signal is provided to the speaker 24. Speaker 24 provides output sound 50 to the user 48 which is perceivable by the user 48 as sound. In an alternative embodiment the speaker 24 can be replaced by another type of output transducer such as a mechanical vibrator or one or more electrodes of a cochlear implant which is configured to stimulate the hearing of the user 48 (not shown). The hearing aid mode therefore allows for using the hearing aid device 10 with the functionality of a common hearing aid, i.e., improving the hearing of the hearing impaired user 48.

In the speech control mode the hearing aid device 10 can be used as a central device that allows for controlling external devices 12 by using speech control. In particular the hearing aid device 10 of FIG. 1 is adapted to use wireless connections to external devices based on the Bluetooth Standard, i.e., particularly to Bluetooth peripherals. In the embodiment as presented in FIG. 1 the only external device 12. Hence the user can use his voice in order to provide speech commands to the external device 12 according to this embodiment or any other external device connected wirelessly to the hearing aid device 10.

In the speech control mode incoming sound 34, possibly the voice of the user is received by the microphones 14 and 14' that generate signals comprising audio. The signals comprising audio are provided to the analog-digital-converter (ADC) 33 which digitizes the signals. The digital signals are provided to the signal processing unit 38, in particular to the speech engine 42. The signal processing unit 38 is adapted for extracting speech signals from the signals comprising audio and for generating control signals based on the speech signals. Therefore the speech analysis unit 44 of the speech engine 42 analyses or interprets the digital signals comprising audio. In particular the speech analysis unit 44 can be adapted to recognize predetermined speech signals in the signals comprising audio. The signal processing unit 38 can furthermore be adapted to determine whether the signals comprising audio originate from the user 48. Additionally the signal processing unit 38 can be adapted to extract speech signals from the signals comprising audio and to generate control signals based on the speech signals only if the signals comprising audio originate from the user 48.

In this embodiment of the speech control mode the speech analysis unit 44 performs own voice detection, i.e., the speech analysis unit 44 determines whether the signals comprising audio originate from the user 48 of the hearing aid device 10. The speech analysis unit 44 therefore compares the difference in the intensity of the signals received at the first microphone 14 and the second microphone 14'. Hence the user's own voice detection can be based on the inverse distance law of sound. The difference in intensity at the microphones 14 and 14' is more significant for a sound source close to the microphones 14 and 14' than for a sound source farther away. A sound source close to the microphones 14 and 14' is for example the mouth of the user 48 of the hearing aid device 10. A sound source farther away from the microphones 14 and 14' is for example the mouth of a person surrounding the user 48 of the hearing aid device 10 that is in conversation with the user or another person. This allows for determining whether the received signal comprising audio originates from the user 48 wearing the hearing aid device 10. Other conventional own voice detection techniques may also be utilized.

One additional or alternative own voice detection technique can for example be based on detecting whether harmonic structure and synchronous energy is present in the signals. This indicates that the user's voice is present. The own voice detection can make use of the unique characteristics of vowels consisting of a fundamental tone and a number of harmonics showing up synchronously in the frequencies above the fundamental tone. The speech analysis unit 44 can be configured to especially detect the voice of the user 48, i.e., own-voice or user voice, e.g., by comparing the signals to training voice patterns of the user 48 of the hearing aid device 10. The training voice patterns of the user 48 can be stored in the memory 36.

The speech analysis unit 44 comprises a decision control system (DCS) that decides whether the signal is further processed in the signal processing unit 38, in particular whether speech signals of the user 48 are extracted from the signals comprising audio which can then be used to generate control signals. Therefore the decision control system (DCS) is provided with a confidence level CL (cf. FIG. 4). The confidence level CL is defined as the likelihood of the signal comprising audio to be originating from the user 48 of the hearing aid device 10. In other words the confidence level CL is the probability that the signal comprising audio originates from the user 48. The decision of the decision control system (DCS) may be implemented based on a number of measurable quantities, which may be user independent and/or user dependent quantities.

For example, the user independent quantities can include distance of sound source as indicated by difference in intensity from a close source or a farther away source at an input transducer with at least two microphones or a microphone array, speech to noise ratio, or a combination of such quantities. A measure of these quantities is represented as the confidence level CL, i.e., percentage confidence (cf. FIG. 4).

The user dependent quantity may for example include pre-stored command attributes in the voice of the user 48. The command attributes can be stored in the memory 36. The command attributes may include temporal information, and/or spectral information, and/or filter coefficients. Hence the received signal comprising audio together with the pre-stored command attributes can be used as input into the speech analysis unit 44. The speech analysis unit 44 can run a rule based analysis model to arrive at the confidence level CL, which is provided as an input to the Decision Control System.

The confidence level CL determined from the user dependent quantity may be combined with user independent quantities as well. In some instances, weighted averages of different quantities may be used to generate the confidence level CL provided to the decision control system (DCS).

Figure 4:
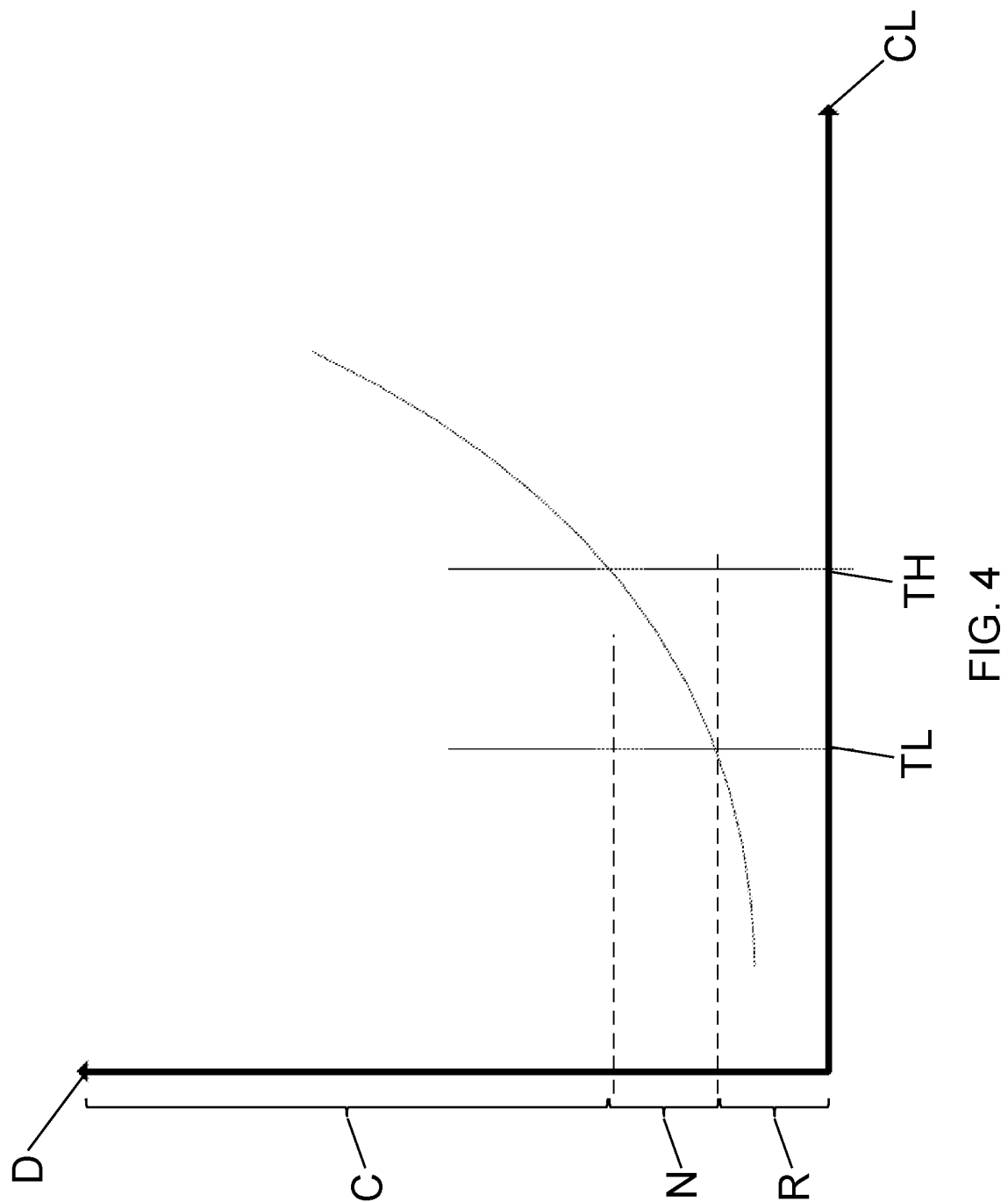
FIG. 4 illustrates a decision diagram in dependence of a confidence level.

The decision control system (DCS) or the signal processing unit 38 stores thresholds for higher confidence level and lower confidence level (higher threshold confidence level TH and lower threshold confidence level TL in FIG. 4). Additionally the signal processing unit 38 is connected to the memory 36 which stores threshold confidence levels. Thus the decision control system (DCS) can be supplied with threshold confidence levels from the memory 36. The threshold confidence levels are stored as part of a profile for a specific external device 12. The memory 36 is thus adapted for storing at least one parameter associated with the user 48, predetermined user environments and/or predetermined external devices in order to improve the determination whether the signals comprising audio originate from the user 48. Predetermined user environments can for example be a noisy or a silent environment. In this case the threshold confidence levels may for example be adjusted according to the predetermined user environment.

The own voice detection can thus be based on threshold confidence levels and/or it can be device dependent, safety level based, location based, and/or learning based. The threshold confidence levels can for example be set by the user by means of a speech command. Therefore profiles can be stored in the memory 36 that comprise threshold confidence levels specific to specific locations, environments, and/or external devices.

The signal processing unit 38 operates according to three different scenarios in dependence of the confidence level CL.

If the confidence level CL is below the lower threshold confidence level TL the signal comprising audio is processed for improving the hearing of the user 48, i.e., the hearing aid device 10 performs the processing of the signals according to the hearing aid mode.

If the confidence level CL is above the lower threshold confidence level TL, but below the higher threshold confidence level TH, the decision control system (DCS) causes the signal processing unit 38 to generate a control signal that is adapted to notify the user that the signal comprising audio could not be identified to be from the user 48. In response to this notification the user 48 can retry issuing a speech command using his voice.

If the confidence level CL is above the higher threshold confidence level TH, the decision control system (DCS) causes the signal processing unit 38 to extract speech signals from the signals comprising audio. The speech signals are provided to the speech analysis unit 44.

The speech signals are analysed or interpreted in the speech analysis unit 44 in order to generate control signals. The generation of the control signals in this embodiment is based on a table assigning speech signals to predetermined control signals. Predetermined control signals, so called commands are adapted for controlling a respective external device 12 or for controlling the hearing aid device 10, i.e., turning on or off the device, changing a mode of operation, increasing or decreasing the sound level, or the like. If the speech signal cannot be interpreted with high enough confidence a control signal in form of a notification is generated that is adapted to notify the user that the speech signal could not be associated to a predetermined control signal. In order to generate the control signals the speech analysis unit 44 determines a control confidence level that corresponds to a probability value that the extracted speech signal corresponds to a predetermined speech signal that is associated to a predetermined control signal. The speech analysis unit 44 in this embodiment uses speech recognition.

Hence the speech signal is compared to predetermined speech signals stored in the memory 36 or the signal processing unit 38. The predetermined speech signals can for example be speech signals from a fitting session or averaged speech signals from a learning over time of the hearing aid device 10. The predetermined speech signals are associated to predetermined control signals by a table. Hence if the speech signal is interpreted to be a predetermined speech signal the predetermined control signal associated to the predetermined speech signal is generated in the signal processing unit 38. The hearing aid device 10 performs the functions or actions according to the control signal when it is executed on the hearing aid device 10. The control signal can for example cause the hearing aid device 10 to transmit the control signal or at least a part of the control signal to a respective external device 12 via the wireless interface 18 and antenna 22 in order to be executed on that device. This allows for controlling the respective external device 12. The wireless interface 18 is adapted for sending the control signals to the respective external device via antenna 22 in order to control the respective external device.

Whether a control signal is generated depends on the control confidence level determined by the speech analysis unit 44.

If the control confidence level is below a lower threshold control confidence level the speech signal is not processed for the generation of control signal. Hence the speech signal is regarded as speech of the user 48 to another person that is not intended as a speech command to be processed by the hearing aid device 10. Alternatively the signal can be processed according to the hearing aid mode.

If the control confidence level is above the lower threshold control confidence level but below a higher threshold control confidence level the signal processing unit 38 generates a control signal for notifying the user that the speech signal could not be associated to a predetermined control signal, i.e., the signal processing unit 38 generates the notification.

If the control confidence level is above the higher control confidence level the signal processing unit 38 generates the predetermined control signal associated to the predetermined speech signal. Hence the speech signal extracted by the signal processing unit 38 is interpreted to correspond to a predetermined speech signal. Predetermined speech signals can be stored in the signal processing unit 38 or in the memory 36. The predetermined control signals are commands, i.e., control signals that are adapted for controlling the hearing aid devices 10 and/or a respective external device 12.

Commands can be adapted to control respective external devices 12 and to additionally cause the hearing aid device 10 to notify the user 48 that the command has been understood and is performed when the command is executed on the hearing aid device 10. Alternatively or additionally a status update can be received from the respective external device controlled by the command when the command is executed on the respective external device. The status update can be received as data 52 via the antenna 22 and wireless interface 18 of the hearing aid device 10. The data 52 is provided to the speech synthesis unit 46 of the speech engine 42 which is adapted to convert data 52 received via the wireless interface into speech signals using speech synthesis in order to allow the speech signals to be presented to the user 48 via the speaker 24. The speech signals can be further processed in the signal processing unit 38 in order to assist the hearing of the user 48. The speech signals are provided to the speaker 24 in order to present them as output sound 50 to the user 48. This allows for example to receive status updates such as a temperature measurement by a respective external device such as from a temperature sensor (not shown).

Additionally or alternatively the signal processing unit 38 can be adapted for converting data 52 received via the wireless interface 18 and/or control signals into signals comprising audio in order to be presented to the user 48 via the speaker 24. In particular the speech synthesis unit 46 of the signal processing unit 38 can be adapted to convert data 52 received via the wireless interface 18 and/or control signals into speech signals using speech synthesis in order to be presented to the user via the speaker 24.

Various other methods can be implemented in order to analyse or interpret the extracted speech signals in the speech analysis unit 44. For example the analysis or interpretation of the speech signals can be based on a Hidden Markov Model, a rule based analysis model, or any other method that allows for analysing or interpreting speech signals in order to generate control signals. The signal processing unit 38 can for example be adapted to use the extracted speech signal along with a set of attributes as input for a rule based analysis model to determine which control signal is to be generated. For example each entry of the set of attributes may correspond to one speech command. In the implementation the speech signal can then be used as input together with the set of attributes in the rule based analysis model to determine which control signal, such as increasing or decreasing sound level, is to be generated. The control signal is chosen from a set of predetermined control signals. The predetermined control signals correspond to predetermined actions performed when the predetermined control signal is executed on the hearing aid device 10 and/or the respective external device.

In conclusion the signal processing unit 38 in this embodiment is adapted to generate a control signal only if the control confidence level of the determination is above a predetermined lower threshold control confidence level. Hence the control confidence level determines whether a control signal is generated or not. The threshold control confidence levels are preferably predetermined for respective external devices. This may be useful so that for critical external devices the higher threshold confidence level TH is for example set high compared to external devices which are considered as not that critical by the user 48. The threshold control confidence levels can for example be set by the user 48, e.g., during a fitting session, continuous learning of the hearing aid device 10, manually, or any other method known to the person skilled in the art. Furthermore the threshold control confidence adapted to recognize predetermined speech level can also be location and/or time dependent, e.g., depending on the sound environment, the time of the day, the coordinates of the user, or the like. For example the control confidence level can be different in a home environment and an office environment.

Whether a control signal is generated in conclusion depends on both the confidence level and the control confidence level. Four different scenarios, as presented in Table 1 are possible. If the confidence level is above the higher threshold level the signal comprising audio is considered to be originating from the user, i.e., own-voice is detected. In scenario 4 no own-voice is detected (cf. Table 1). In scenarios 1 to 3 own-voice is detected (cf. Table 1). In scenario 3 the control confidence level is below the lower threshold control confidence level. Therefore the signal is not interpreted. In scenario 3 and scenario 4 the signal processing unit 38 processes the signal using the digital signal processor (DSP) 40 in order to assist the hearing impaired user 48 in hearing or optionally, particularly for scenario 3 the signal is not processed at all. In scenario 2 the control confidence level is above the lower threshold control confidence level but below the higher threshold control confidence level. Hence the signal processing unit 38 generates a control signal in form of a notification that causes the hearing aid device 10 to notify the user that the signal could not be associated to a predetermined control signal. In scenario 1 the control confidence level is above the higher threshold control confidence level and a control signal is generated that is adapted to control the hearing aid device 10 and/or a respective external device 12. Optionally the control signal causes the hearing aid device 10 to notify the user 48 that the speech command of the user 48 was accepted.

TABLE 1

|  | scenario 1 | scenario 2 | scenario 3 | scenario 4 |
|---|---|---|---|---|
| own-voice | yes | yes | yes | no |
| signal interpreted | yes | yes (but no command identified; CL between TL and TH in FIG. 3) | no (below TL in FIG. 3) | no |
| notify user | yes (optional) | yes | no | no |

Various profiles can be stored in the memory 36. The profiles can for example comprise sets of predetermined control signals associated to predetermined speech signals which can be device, location and/or time dependent. For example, a different set of commands can be stored for home environment and office environment. It is also for example possible to store different sets of commands for two different external devices.

Both the threshold confidence levels and the threshold control confidence levels can be dependent on the user's location. Hence if the user changes his location the threshold confidence levels and the threshold control confidence levels can be automatically updated. The user's location can for example be determined by technologies like iBeacon or by GPS coordinates of the hearing aid device 10, or the location of a base station such as a mobile phone communicatively connected to the hearing aid device 10. Based on such determination the stored profiles, e.g. from the previous location can be used as basis for the updated threshold confidence levels and the updated threshold control confidence levels.

The setting of the threshold confidence levels and the threshold control confidence levels can be based on a learning system, where the user 48 gets audio feedback while setting the thresholds. This allows the user 48 to arrive at optimal threshold confidence levels and threshold control confidence levels to achieve reliable communication without too many false negatives.

Furthermore a continuous monitoring with audio notification can be enabled. The speech analysis unit 44 generates a control signal which is transmitted to a respective external device 12 in form of data 52. Upon the reception of the data 52 the external device 12 performs the functions or actions according to the control signal and sends a status update to the hearing aid device 10. For example a sensor value of sensor 30 can be continuously monitored and transmitted from the external device 12 to the hearing aid device 10 as status update in form of data 52. The status update is converted in the speech synthesis unit 46 into a signal comprising audio in order to be presented to the user 48. The signal comprising audio is provided to the speaker 24 that provides an output sound 50 to the user 48. The user 48 can then listen to the status update received from the external device 12 as output sound 50.

Some examples of speech control functionality are presented as follows:

A user 48 uses his voice as a speech command to initiate a Bluetooth connection from the hearing aid device 10 to a Bluetooth peripheral. The speech command is converted to a Bluetooth command using speech recognition. The Bluetooth connection status is converted into speech using speech synthesis. The users then hears the status of the connection.

A user 48 uses his voice as a speech command to query the profiles/attributes in the Bluetooth peripheral. In reaction he hears a list of supported profiles/attributes.

A user 48 uses a speech command to make a query to read the attribute from the connected Bluetooth peripheral, e.g., a home monitoring and controlling device that allows for controlling the temperature of the room and/or devices like the fridge and oven. He hears the read back attribute as a synthesized sound. In particular the user can send a speech command to receive information on the current temperature. Therefore the user 48 can issue the speech command "What is the temperature." In response the user 48 receives "Current temperature is 20° Celsius." by the speaker 24 in the ear 47 of the user 48.

A user 48 uses his voice to issue a speech command to set an attribute in the Bluetooth peripheral. In response the user 48 receives a conformation. In particular the speech command can for example be "Set the current temperature to 20° Celsius". In response the Bluetooth peripheral sets the current temperature to 20° Celsius and transmits a signal to the hearing aid device 10 which causes the hearing aid device 10 to issue the notification "Current temperature is set to 20° Celsius.".

A user 48 uses voice as a speech command to set a rule of Bluetooth interaction. In response the user 48 receives the status accordingly. In particular the speech command can for example be "Monitor the current temperature continuously and let me know the current temperature every 10 seconds." In response the Bluetooth peripheral transmits a signal to the hearing aid device 10 every 10 seconds stating the current temperature, e.g., "Current temperature is 37° Celsius.". Another speech command can for example be "Monitor continuously the current temperature and let me know if the reading is more than 38° Celsius." In response the Bluetooth peripheral issues a signal and transmits the signal to the hearing aid device 10 only if the condition is satisfied, e.g., as soon as the current temperature is above 38° Celsius the Bluetooth peripheral issues a signal that causes the hearing aid device 10 to provide a signal to the user 48 stating "Temperature is more than 38° Celsius."

A user 48 uses voice as a speech command to automatically connect a Bluetooth peripheral, in particular the external device 12 with the hearing aid device 10 in order to wirelessly receive data 52. The signal processing unit 38 can therefore be adapted for activating the wireless interface 18 upon recognizing a predetermined speech signal in the signals comprising audio. In particular the predetermined speech signal can be recognized by the speech analysis unit 44. The wireless interface 18 can be adapted to establish a connection to a predetermined external device, in this embodiment the external device 12 in dependence of the specific predetermined speech signal recognized by the speech analysis unit 44 upon activation. For example if the external device 12 rings, a speech command of the user 48 can be "Pick up the call." In response to the speech command the hearing aid device 10 connects wirelessly to the external device 12 in order to pick up the call, i.e., transmitting data 52 to the hearing aid device 10. Furthermore the speech command causes the wireless receiving mode and the communication mode of the hearing aid device 10 to be activated in order to allow the user 48 to use the external device 12 and hearing aid device 10 to communicate with another person via the public telephone network.

In the wireless receiving mode the hearing aid device 10 can be used to receive data 52 wirelessly. Data 52 is received wirelessly via the antenna 22 and wireless interface 18. The data is provided to the signal processing unit 38. The signal processing unit 38 processes the data 52. If the data 52 is a signal comprising audio, the signal is processed by the digital signal processor (DSP) 40 in order to assist the hearing of the hearing impaired user 48. If the data 52 is in another format that cannot be processed by the digital signal processor (DSP) 40 directly, the data 52 is provided to the speech synthesis unit 46. Such data 52 can for example be sensor values determined by the sensor 30 of the external device 12. The sensor 30 in this embodiment is a temperature sensor. Sensor 30 in alternative embodiments can also be a tilt sensor, humidity sensor, pressure sensor, or any other kind of sensor. The sensor values determined by the sensor 30 are preferably generated in response to a control signal provided by the hearing aid device 10. The speech synthesis unit 46 generates a signal comprising audio based on the data 52 using speech synthesis. The signal comprising audio can then be provided to the digital signal processor (DSP) 40 in order to process the signal. The processed signal is provided to the speaker 24 in order to provide an output sound 50 to the user 48. The wireless receiving mode allows to receive signals comprising audio and other data 52 wirelessly. The wireless receiving mode can for example be run in parallel with the hearing aid mode on the hearing aid device 10, which allows receiving sound from the surroundings as well as sounds farther away that are wirelessly transmitted to the user 48 from external devices.

In the communication mode the hearing aid device 10 can be used to communicate with other external devices 12.

In the communication mode incoming sound 34 is received by microphones 14 and 14' that generate signals comprising audio. The signals are provided to analog-digital-converter (ADC) 33 which generates digital signals. The digital signals are provided to signal processing unit 38 which processes the signals, e.g., by noise reduction, applying frequency dependent gain or the like. The processed signals are then provided to the wireless interface 18. Alternatively the digital signals can be directly provided to the wireless interface 18 without processing them in the signal processing unit 38 (not shown). The digital signals are then provided to the external device 12 via wireless interface 18, antenna 22 and antenna 26 as data 52. The wireless interface 28 of the external device 12 receives the data 52 and provides it to the interface to another network 32, which is connected to another external device, e.g., a base station of the public telephone network, mobile phone, a telephone, a personal computer, a tablet computer, or any other device. The communication mode can for example be run in parallel with the wireless receiving mode allowing a user 48 to use the hearing aid device 10 in order to communicate via external device 12 with a person far away using a communication device, such as a mobile phone. The wireless receiving mode allows receiving signals comprising audio from the mobile phone while the communication mode allows to provide signals comprising audio to the mobile phone. Therefore using both mode in parallel allows for a communication via the mobile phone using the hearing aid device 10.

The hearing aid device 10 further comprises a switch 54 to, e.g., select and control the modes of operation. The switch 54 can for example be a button, a touch sensitive display, an implant connected to the brain functions of a user, a voice interacting interface or other kind of interface used for activating and/or deactivating the switch 54. For example the switch 54 can be switched by a speech command turning on and off the speech functionality of the hearing aid device 10 except for the speech command that activates the speech functionality again. The switch 54 can also for example be activated or deactivated by a blinking sequence of the eyes of the user or by clicking or pushing a button which activates the switch 54.

The memory 36 is additionally adapted to store data, such as the modes of operation, algorithms and other parameters, e.g., spatial direction parameters.

Figure 2:
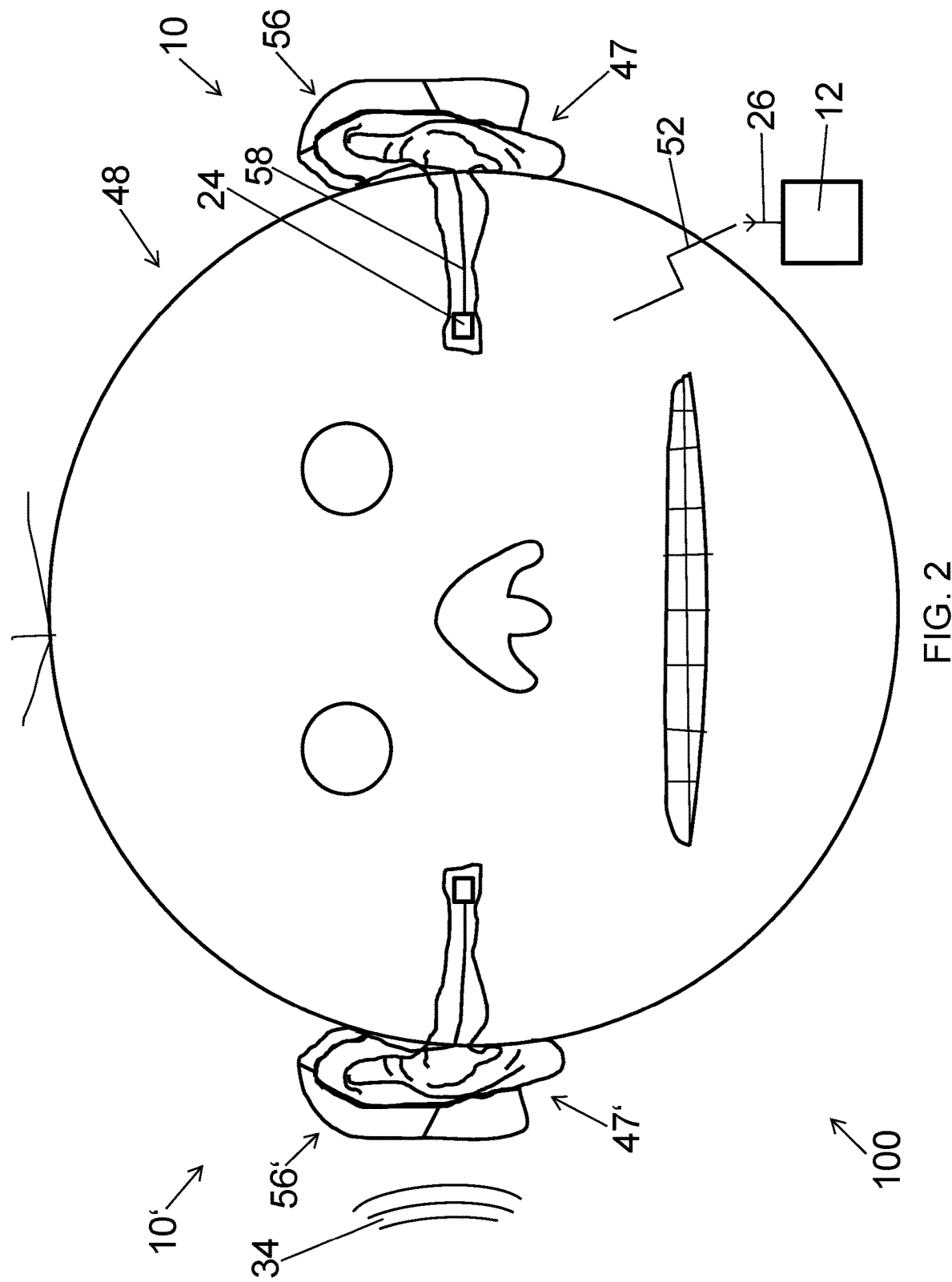
FIG. 2 illustrates a hearing system according to a second embodiment of the disclosure.

FIG. 2 illustrates a hearing system 100 with two hearing aid devices 10 and 10' and an external device 12. The hearing aid devices 10 and 10' can perform the same modes of operation as presented for the hearing aid device 10 of the embodiment of FIG. 1.

The hearing aid device 10 has a Behind-The-Ear (BTE) unit 56 arranged behind the left ear 47 of user 48. The hearing aid device 10' has a Behind-The-Ear (BTE) unit 56' arranged behind the right ear 47' of the user 48. The Behind-The-Ear (BTE) units 56 and 56' comprise essentially all the components of the hearing aid device 10 and 10' except the speaker 24, which is connected to the Behind-The-Ear (BTE) unit 56 via wire 58.

Each of the hearing aid devices 10 and 10' can receive incoming sound 34 via its respective microphones. Data 52 can be received wirelessly from antenna 26 of the external device 12 via respective antennas and wireless interfaces at each of the hearing aid devices 10 and 10'. Data can also be received from the respective other hearing aid device 10 or 10' at the other hearing aid device 10' or 10. The hearing aid devices 10 and 10' can also transmit data 52 to the external device 12. The external device 12 is adapted to perform predetermined functions upon receiving a control signal from one or both of the hearing aid devices 10 or 10'.

The hearing aid devices 10 and 10' can be operated as a binaural hearing system. Therefore in particular signals comprising audio can be exchanged via the antennas and wireless interfaces of the hearing aid device 10 and 10' in form of data. The signals comprising audio from both hearing aid devices 10 and 10' can be used in order to improve the hearing of the user 48. The signals can therefore be processed according to methods known to the person skilled in the field of binaural hearing systems. One or both of the hearing aid devices 10 and 10' can be used in order to control respective external devices 12. Hearing aid device 10 can also be used to control hearing aid device 10' and hearing aid device 10' can be used to control hearing aid device 10. The hearing aid device controlled by the other hearing aid device, hence, corresponds to an external device in view of the respective hearing aid device 10 and 10' controlling the other hearing aid device.

Figure 3:
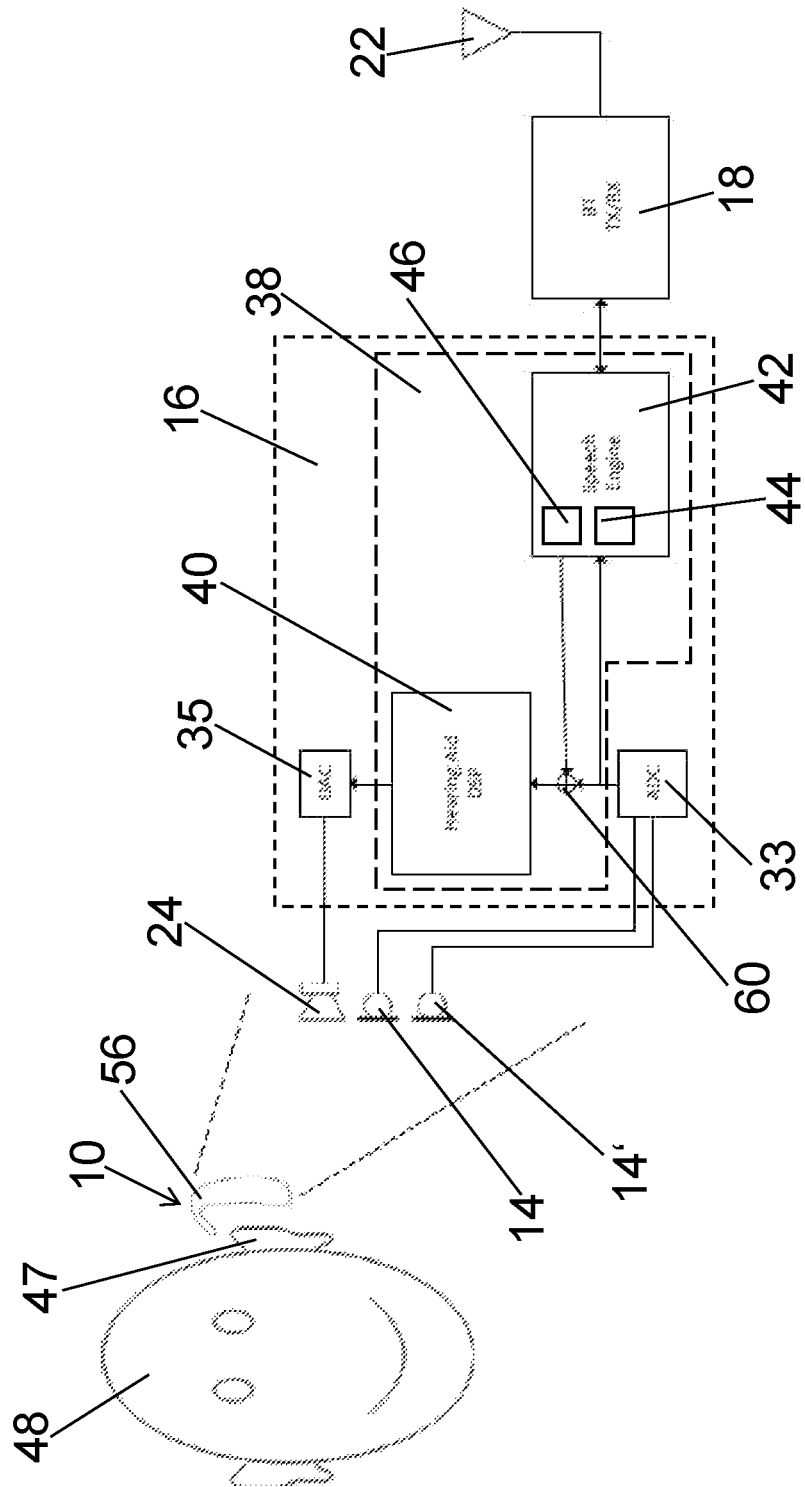
FIG. 3 illustrates a hearing aid device according to a second embodiment of the disclosure.

FIG. 3 illustrates a second embodiment of the hearing aid device 10 according to the disclosure. The hearing aid device 10 of FIG. 3 essentially comprises the same components as the hearing aid device 10 of FIG. 1.

Hence the hearing aid device 10 comprises two microphones 14, 14', electric circuitry 16, a wireless interface 18, an antenna 22, and a speaker 24.

Differences can be found in the electric circuitry 16. The electric circuitry 16 comprises an analog-digital-converter (ADC) 33, a signal processing unit 38, and a digital-analog-converter (DAC) 35. The signal processing unit 38 comprises a speech engine 42, a summation unit 60, and a digital signal processor (DSP) 40. The wireless interface 18 in this embodiment has a transmitting coil and a receiving coil. The speech engine 42 comprises speech analysis unit 44 and speech synthesis unit 46.

Signals comprising audio received by the two microphones 14 and 14' are provided to the analog-digital-converter 33 which digitizes the signals. The digital signals are provided to the speech engine 42 and the summation unit 60.

Data received wirelessly via the antenna 22 and wireless interface 18 is provided to the speech engine 42 as digital signal.

The speech engine 42 processes the signal either received via the two microphones 14 and 14' or via the antenna 22 and wireless interface 18 and provides the processed signal to the summation unit 60 which adds the signal to the signal comprising audio in order to provide it to the digital signal processor (DSP) 40. The speech engine 42 can also be provided with a signal comprising audio initially received at the microphones 14 and 14' and a signal wirelessly received via the antenna 22 and wireless interface 18. The speech engine 42 can either process the signals comprising audio together to generate a combined processed signal or each on its own in order to eventually or optionally add the signals after the processing. The digital signal processor (DSP) 40 performs common hearing aid functions on the signals, i.e., noise reduction, frequency dependent gain or the like and provides it to the digital-analog-converter 35 which converts the digital signal to an analog signal. The analog signal is then provided to the speaker 24 which generates a sound which can be perceived by the user 48.

In this embodiment all components of the hearing aid device 10 except speaker 24 are included in a Behind-The-Ear (BTE) unit 56. The Behind-The-Ear (BTE) unit 56 is arranged behind ear 47 of user 48.

FIG. 4 illustrates a decision diagram in dependence of a confidence level CL. The curve represents a confidence level expressed in a parameter quantity. The parameter quantity may be selected from a signal-to-noise ratio (SNR) of the signal comprising audio, a speech intelligibility estimate, level difference between the level received at two microphones of the hearing aid device. The parameter quantity may be frequency specific or weighted average across a frequency band. The weighted average allows for giving higher preference to more critical frequencies and thus providing more reliable determination of the confidence level.

If the confidence level CL is below a lower threshold confidence level TL the decision is a rejection R for extracting a speech signal from the signal comprising audio. Instead the signal is processed in the digital signal processor (DSP) 40 according to the hearing aid mode. Alternatively the signal can also be silently ignored, i.e., in this case the signal is not processed at all. If the confidence level CL is between a lower confidence level TL and a higher confidence level TH a control signal in form of a notification N is generated. This control signal causes the hearing aid device 10 to notify the user 48 that it could not be determined with high enough confidence that the signal comprising audio originates from the user 48. If the confidence level CL is above a higher confidence level TH a speech signal is extracted from the signal in order to generate a control signal corresponding to command C which causes the hearing aid device 10 to extract speech signals. In order to generate the control signal a control confidence level is determined. Depending on the control confidence level the speech signal is either rejected for generating a control signal, a control signal in form of a notification is generated or a control signal in form of a command is generated. If a control signal in form of a command C is generated the speech signal is associated to a predetermined command which is used in order to control the hearing aid device 10 or an external device connected wirelessly to the hearing aid device 10. The control signal can also control the hearing aid device 10 and the external device, e.g., by causing the hearing aid device 10 to notify the user that the command has been accepted and by causing the external device to perform one or more specific functions. Speech commands can also be used to control more than one external device.

Figure 5:
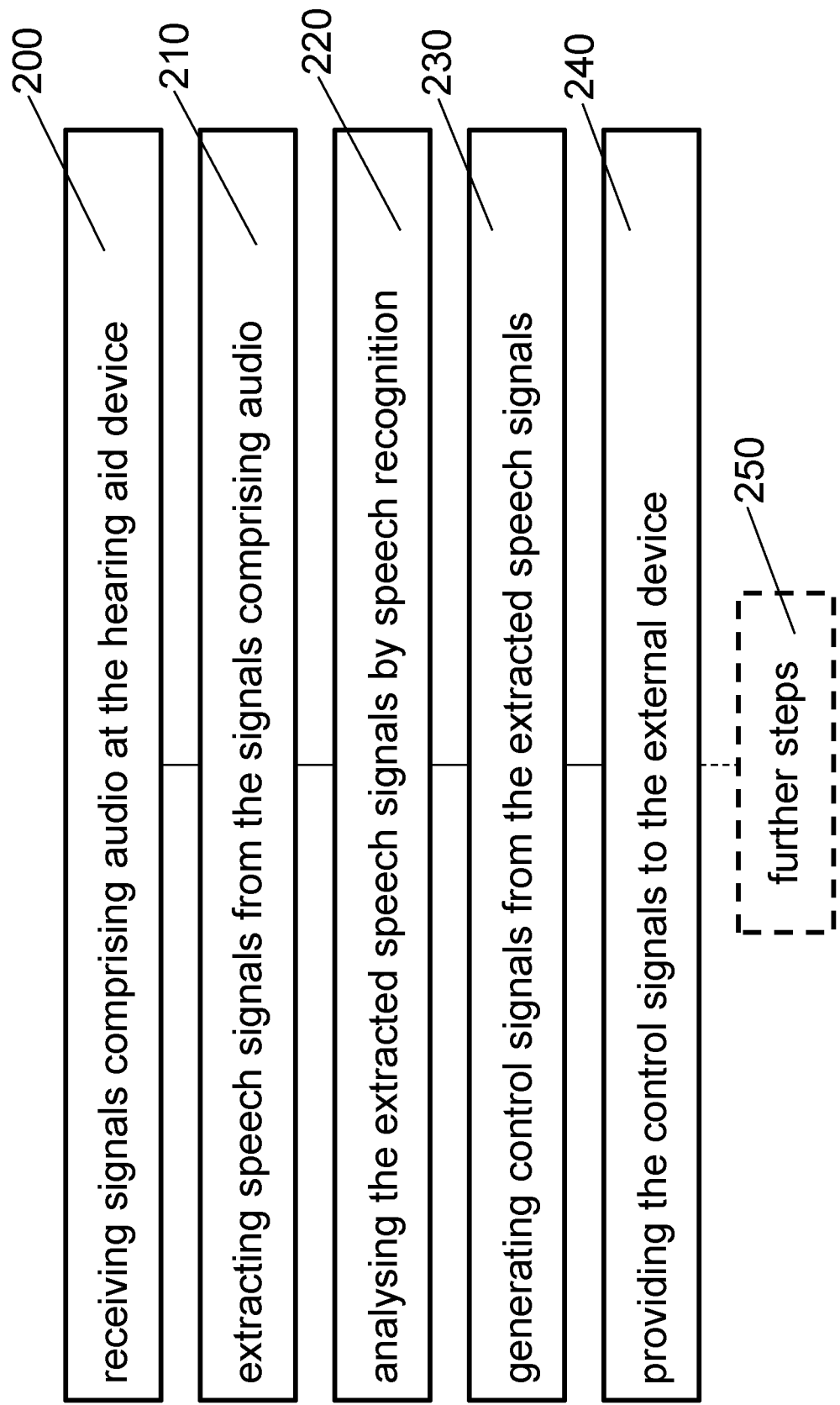
FIG. 5 illustrates a flow chart of a method according to a first embodiment of the disclosure.

FIG. 5 illustrates a flow chart of a method according to a first embodiment of the disclosure. The method is for a wireless receiving and/or sending of data from a hearing aid device to an external device in order to control the external device via the hearing aid device. The method comprises the steps:

200 Receiving signals comprising audio at the hearing aid device.

210 Extracting speech signals from the signals comprising audio.

220 Analysing the extracted speech signals by speech recognition.

230 Generating control signals from the extracted speech signals.

240 Providing the control signals to the external device in order to control the external device.

The control signals are adapted for controlling the external device. The method can comprise one or more further steps 250.

For example the method can comprise further steps 250 such as a step of receiving data from the external device at the hearing aid device. The method can further comprise a step of extracting signals comprising audio from the data. Extracting signals comprising audio from the data can for example be performed by using speech synthesis. Furthermore the method can comprise a step of providing the signals comprising audio to a user.

Figure 6:
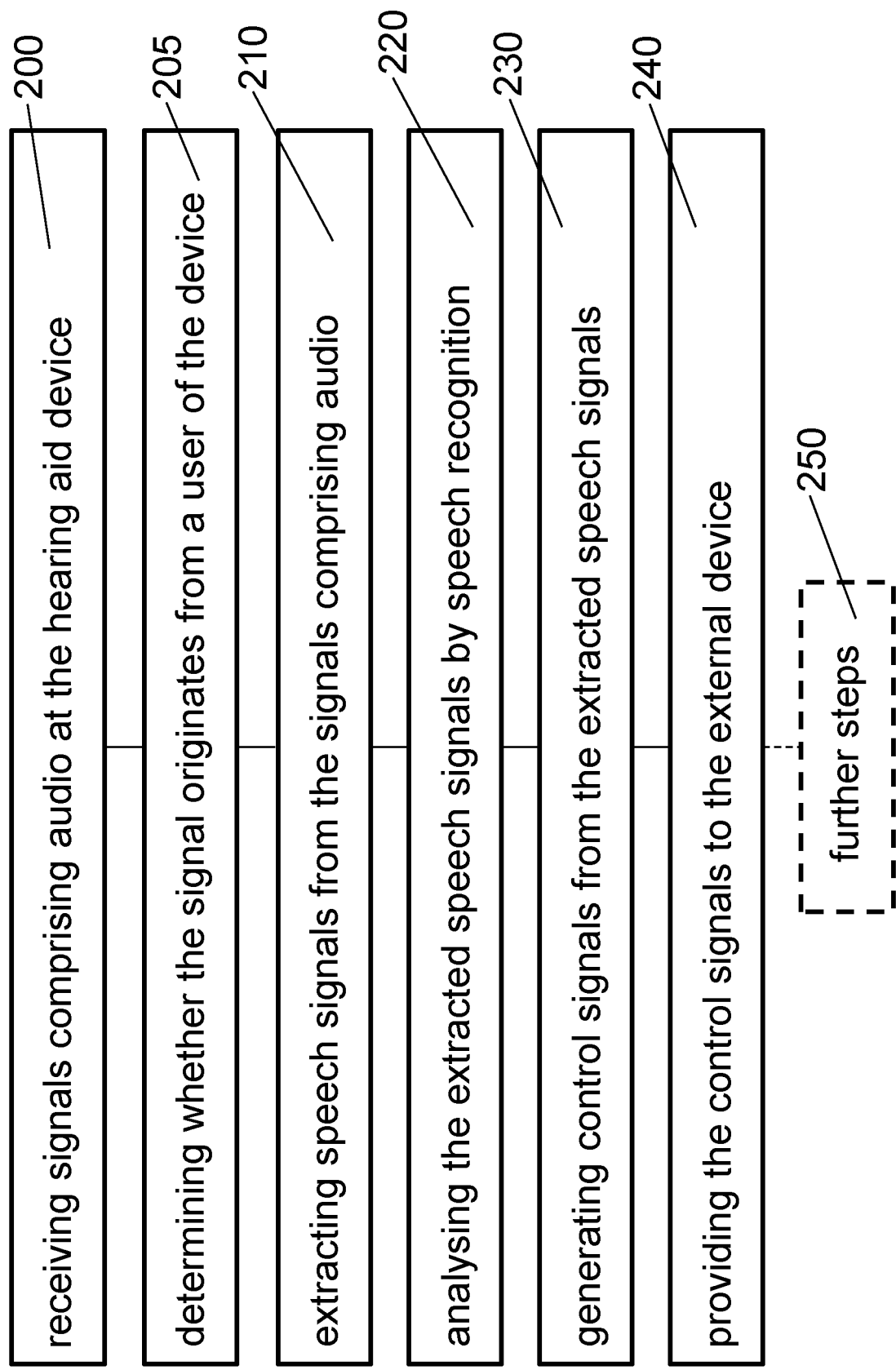
FIG. 6 illustrates a flow chart of a method according to a second embodiment of the disclosure.

FIG. 6 illustrates a flow chart of a method according to a second embodiment of the disclosure. The method is for a wireless receiving and/or sending of data from a hearing aid device to an external device in order to control the external device via the hearing aid device. The method comprises the steps:

200 Receiving signals comprising audio at the hearing aid device.

205 Determining whether the signals comprising audio originate from a user of the hearing aid device. Only perform further steps if the signals comprising audio originate from the user of the hearing aid device. If the signals comprising audio are determined to originate from the user, run the following steps, i.e., 210, 220, 230, 240, and optionally 250. If the signals comprising audio cannot be determined with high enough confidence to be from the user, provide a notification to the user, i.e., a sound or audible signal that informs the user that the determination was not possible with high enough confidence. If the signals comprising audio are determined not to originate from the user, do not perform the following steps 210, 220, 230, and 240.

Alternatively if the signals comprising audio are determined not to originate from the user, steps of a conventional hearing aid mode can be performed, i.e., the signals comprising audio can be processed in order to improve the hearing of the user of the hearing aid device, e.g., by noise reduction, applying a frequency dependent gain, or the like. The signals processed according to the conventional hearing aid mode can then be provided to the user.

210 Extracting speech signals from the signals comprising audio.

220 Analysing the extracted speech signals by speech recognition.

230 Generating control signals from the extracted speech signals.

240 Providing the control signals to the external device in order to control the external device.

Optionally one or more further steps 250 can be performed.

Figure 7:
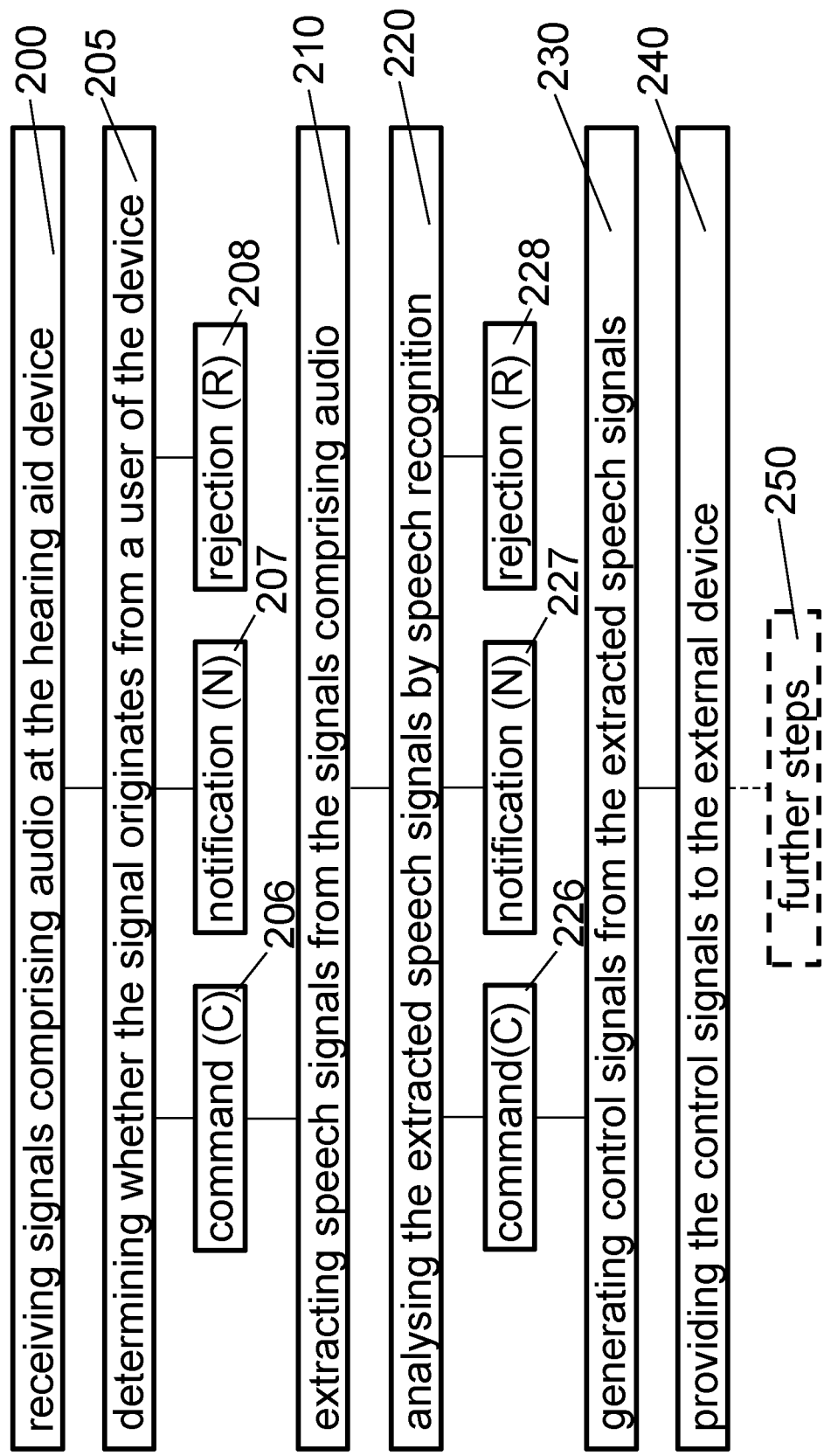
FIG. 7 illustrates a flow chart of a method according to a third embodiment of the disclosure.

FIG. 7 illustrates a flow chart of a method according to a third embodiment of the disclosure. The method is for a wireless receiving and/or sending of data from a hearing aid device to an external device in order to control the external device via the hearing aid device. The method comprises the steps:

200 Receiving signals comprising audio at the hearing aid device.

205 Determining whether the signals comprising audio originate from a user of the hearing aid device. Depending on the determination one of the following steps 206, 207 or 208 is performed.

206 If the signals comprising audio are determined to originate from the user, run steps

210 and 220. This corresponds to the command C to extract speech signals in FIG. 4.

207 If the signals comprising audio cannot be determined with high enough confidence to be from the user, provide a notification N (cf. FIG. 4) to the user, i.e., a sound or audible signal that informs the user that the determination was not possible with high enough confidence.

208 If the signals comprising audio are determined not to originate from the user, do not perform any further step. This corresponds to a rejection R in FIG. 4. Alternatively process the signals comprising audio in order to improve the hearing of the user of the hearing aid device, e.g., by noise reduction, applying a frequency dependent gain, or the like. The signals processed according to the conventional hearing aid mode can then be provided to the user.

210 Extracting speech signals from the signals comprising audio.

220 Analysing the extracted speech signals by speech recognition.

226 If the extracted speech signals can be associated to a predetermined control signals, run steps 230 and 240. This corresponds to the command C to generate control signals in FIG. 4.

227 If the speech signals cannot be associated to predetermined control signals with high enough confidence, provide a notification N (cf. FIG. 4) to the user, i.e., a sound or audible signal that informs the user that the speech signals could not be associated to predetermined control signals with high enough confidence.

228 If the speech signals are determined not to be control signals, do not perform any further step. This corresponds to a rejection R in FIG. 4. Alternatively process the signals comprising audio in order to improve the hearing of the user of the hearing aid device, e.g., by noise reduction, applying a frequency dependent gain, or the like. The signals processed according to the conventional hearing aid mode can then be provided to the user.

230 Generating control signals from the extracted speech signals.

240 Providing the control signals to the external device in order to control the external device.

Optionally one or more further steps 250 can be performed.

Figure 8:
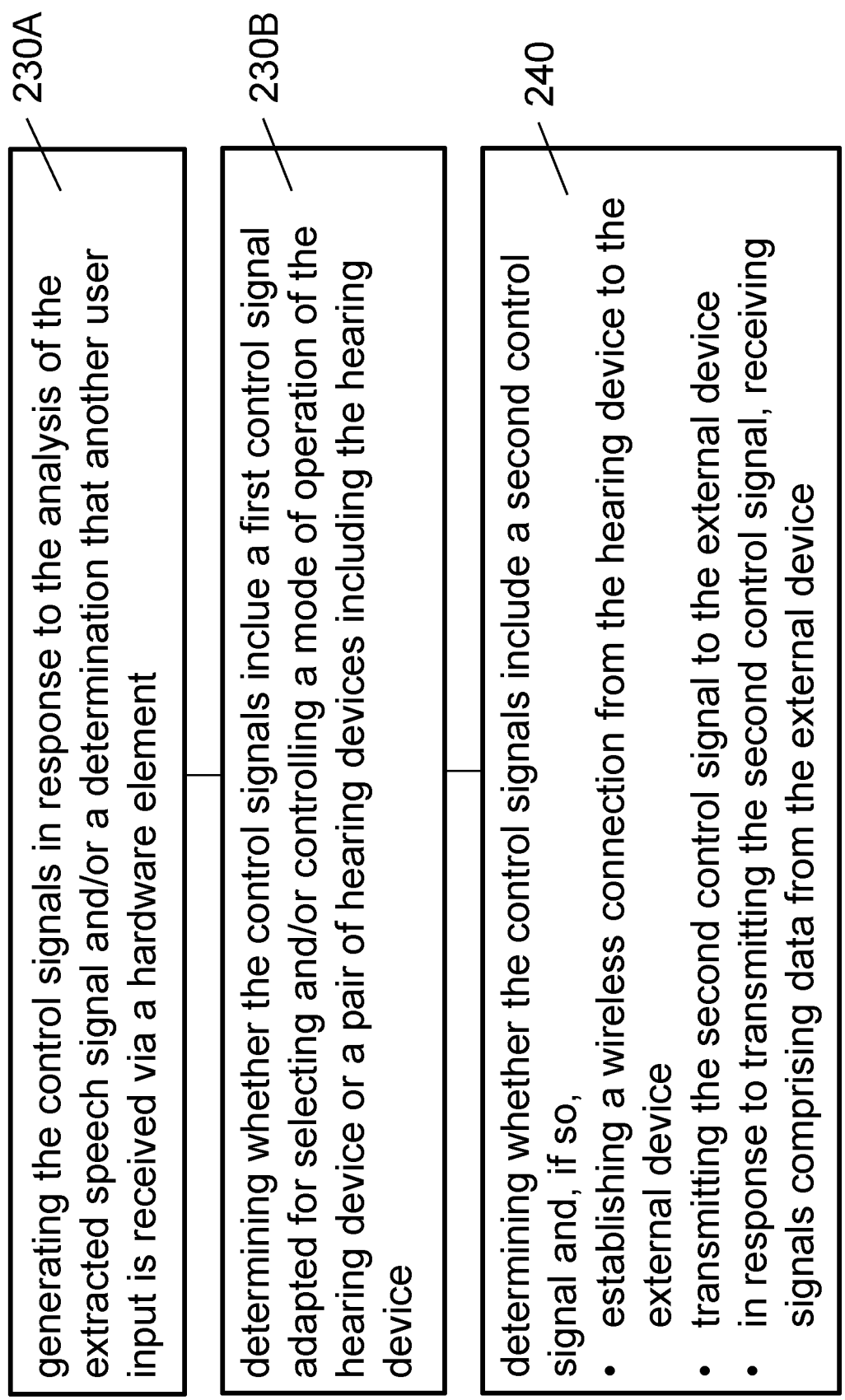
FIG. 8 illustrates a flowchart of an example implementation of steps in the method according to any of the FIGS. 5, 6, and 7.

FIG. 8 illustrates a flowchart of an example for implementing steps 230 and 240 of the method according to the embodiment of the disclosure. According to this example, step 230 may be implemented as

230A: Generating the control signals in response to at least one of the analysis of the extracted speech signal and a determination that another user input is received via a hardware element.

230B: Determining whether the control signals include a first control signal amd, in response to a determination that the signals include the first control signal, selecting and/or controlling a mode of operation of the hearing device or a pair of hearing devices including the hearing device.

240: Determining whether the control signals include a second control signal, and in response to a determination that the control signals include the second control signals:

Establishing a wireless connection from the hearing device to the external device.

Transmitting the second control signal to the eternal device.

In response to transmitting the second control signal to the external device, receiving from the external device signals comprising data.

In one embodiment that is not represented by a figure a hearing aid device comprises a cochlear implant. A Cochlear Implant typically includes i) an external part for picking up and processing sound from the environment, and for determining sequences of pulses for stimulation of the electrodes in dependence on the current input sound, ii) a (typically wireless, e.g. inductive) communication link for simultaneously transmitting information about the stimulation sequences and for transferring energy to iii) an implanted part allowing the stimulation to be generated and applied to a number of electrodes, which are implantable in different locations of the cochlea allowing a stimulation of different frequencies of the audible range. Such systems are e.g. described in U.S. Pat. No. 4,207,441 and in U.S. Pat. No. 4,532,930.

In an aspect, the hearing aid device comprises multi-electrode array e.g. in the form of a carrier comprising a multitude of electrodes adapted for being located in the cochlea in proximity of an auditory nerve of the user. The carrier is preferably made of a flexible material to allow proper positioning of the electrodes in the cochlea such that the electrodes may be inserted in cochlea of a recipient. Preferably, the individual electrodes are spatially distributed along the length of the carrier to provide a corresponding spatial distribution along the cochlear nerve in cochlea when the carrier is inserted in cochlea.

In an aspect, the functions may be stored on or encoded as one or more instructions or code on a tangible computer-readable medium. The computer readable medium includes computer storage media adapted to store a computer program comprising program codes, which when run on a processing system causes the data processing system to perform at least some (such as a majority or all) of the steps of the method described above, in the description and in the claims.

By way of example, and without limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium. In particular the steps 205, 206, 207, 208, 210, 220, 226, 227, 228, and 230 of the method according to the embodiment of the disclosure may be implemented in software.

In an aspect, a data processing system comprises a processor adapted to execute the computer program for causing the processor to perform at least some (such as a majority or all) of the steps of the method described above and in the claims. In particular the steps 205, 206, 207, 208, 210, 220, 226, 227, 228, and 230 of the method according to the embodiment of the disclosure may be implemented in software.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled"

to another element, it can be directly connected or coupled to the other element but an intervening elements may also be present, unless expressly stated otherwise. Furthermore, "connected" or "coupled" as used herein may include wirelessly connected or coupled. As used herein, the term "and/or" includes any and all combinations of one or more of the associated listed items.

The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

REFERENCE SIGNS 10, 10' hearing aid device
12 External device
14, 14' first microphone, second microphone
16 electric circuitry
18 wireless interface
22 antenna
24 speaker
26 antenna
28 wireless interface
30 sensor
32 interface to a public telephone network
33 analog-digital-converter (ADC)
34 incoming sound
35 digital-analog-converter (DAC)
36 memory
38 signal processing unit
40 digital signal processor (DSP)
42 speech engine
44 speech analysis unit
46 speech synthesis unit
47, 47' left ear, right ear
48 hearing impaired user
50 output sound
52 data
54 switch
56, 56' Behind-The-Ear unit (BTE)
58 wire
60 summation unit
100 hearing system
C command
CL confidence level
D decision
N notification
R rejection
TL lower threshold confidence level
TH higher threshold confidence level

The invention claimed is:

1. A method performed by a hearing device for communicating in a hearing system including an external electronic device with a first sensor, a first wireless interface, and a first antenna, wherein the hearing device includes an input transducer, an output transducer adapted to emit a signal comprising audio, a signal processing unit, a second antenna, and a second wireless interface, the method comprising:
  receiving, via the at least one input transducer, an input audio signal;
  processing, using the signal processing unit, the input audio signal to compensate for a hearing loss of a user;
  emitting, using the at least one output transducer, a processed audio signal to the user;
  determining, using the signal processor, whether the input audio signal originates from the user; and
  in response to a determination that the input audio signal from the user:
    extracting a recognized speech signal from the input audio signal, and analysing the extracted recognized speech signal, by speech recognition within the signal processor unit, and
    generating, using the signal processor unit, control signals in response to at least one of: the analysis of the extracted recognized speech signal or a determination that another user input is received via a hardware element;
  determining, using the signal processor unit, whether the control signals include a first control signal, the first control signal being adapted for selecting and/or controlling a mode of operation of the hearing device or a pair of cooperative hearing devices including the hearing device;
  determining, using the signal processor unit, whether the control signals include a second control signal, and in response to determining that the control signals include the second control signal:
    establishing a wireless connection from the hearing device to the external electronic device,
    transmitting, via the second wireless interface and via the second antenna, the second control signal to the external electronic device, and
    in response to transmitting the second control signal to the external electronic device, receiving from the external electronic device, via the second wireless interface and via the second antenna, signals comprising data;
  wherein the second wireless interface is configured to communicate with the first wireless interface via the second antenna and the first antenna.

2. The method of claim 1, wherein the hearing device includes a memory, the method further comprising:
  storing, in the memory, one or more of:
    at least one parameter associated with the user;
    at least one parameter associated with predetermined user environments; and
    at least one parameter associated with predetermined external devices;
  wherein the determination as to whether the input audio signal from the user is based on the one or more parameters stored in the memory.

3. The method of claim 1, further comprising:
  converting data received via the wireless connection and/or the control signals into output audio signals; and emitting, using the output transducer, the output signals to the user.

4. The method of claim 3,
Wherein the converting of the data received via the wireless connection and/or the control signals into the output audio signals includes performing speech synthesis such that the output audio signals include synthesized speech signals.

5. The method of claim 3, further comprising:
in response to determining that the control signals include the second control signal:
    receiving from the external electronic device, via the second wireless interface and via the second antenna, audio signals; and
    emitting, using the output transducer, the output audio signals to the user.

6. The method of claim 1, wherein the hearing device includes at least two input transducers outputting a first audio signal and a second audio signal, the method further comprising:
    comparing, using the signal processor unit, the first audio signal and the second audio signal;
    wherein the determination whether the input audio signal originates from the user is performed based on the comparison of the first audio signal and the second audio signal.

7. The method of claim 1, further comprising:
    determining, using the signal processing unit, a confidence level based on the input audio signal, wherein the confidence level corresponds to a likelihood of the input audio signal originating from the user of the hearing aid device; and
    processing, using the signal processing unit, the input audio signal according to the confidence level.

8. The method of claim 7, further comprising:
    in response to determining that the confidence level is below a lower threshold confidence level, processing, using the signal processing unit, the input audio signal in accordance with the hearing loss of the user, wherein processing of the input audio signal is in accordance with a hearing aid mode;
    in response to determining that the confidence level is above the lower threshold confidence level, but below a higher threshold confidence level, generating, using the signal processing unit, a notification control signal notifying the user;
    in response to determining that the confidence level is above the higher threshold confidence level, performing the extracting of the recognized speech signal from the input audio signal, and the analysing of the extracted speech signal, by the speech recognition.

9. A hearing device comprising:
an input transducer adapted to receive audio signals;
an output transducer adapted to emit a signal comprising audio;
a second antenna;
a second wireless interface; and
a signal processing unit;
wherein the signal processing unit is configured to perform the method of claim 1.

10. A method performed by a hearing device for communicating in a hearing system including an external electronic device with a first sensor, a first wireless interface, and a first antenna, wherein the hearing device includes an input transducer adapted to receive audio signals, a signal processor, a second antenna, and a second wireless interface; the method comprising:

receiving the audio signals via the input transducer;
using the signal processor, extracting a recognized speech signal from the audio signals and based thereon generating a control signal;
establishing a wireless connection from the hearing device to the external electronic device;
transmitting, via the second wireless interface and via the second antenna, the control signal to the external electronic device; and
in response to transmitting the control signal to the external electronic device, receiving from the external electronic device, via the second wireless interface and via the second antenna, a sensor value signal including a sensor value;
wherein the second wireless interface is configured to communicate with the first wireless interface via the second antenna and the first antenna.

11. The method of claim 10, further comprising:
determining, using the signal processor, whether the audio signals originate from the user;
in response to determining that the audio signals originate from the user, transmitting the control signal to the external electronic device;
in response to determining that the audio signals do not originate from the user, forgoing transmitting the control signal to the external electronic device.

12. The method of claim 10, further comprising:
determining, using the signal processor, a confidence level based on the audio signals, wherein the confidence level corresponds to a likelihood of the audio signals originating from the user of the hearing aid device;
processing the audio signals according to the confidence level, including:
    in response to determining that the confidence level does not satisfy a first criterion, forgoing transmitting the control signal to the external electronic device;
    in response to determining that the confidence level does satisfy the first criterion, transmitting the control signal to the external electronic device.

13. The method of claim 10, wherein the hearing device includes a memory, comprising:
storing, in the memory, one or more of:
    at least one parameter associated with the user;
    at least one parameter associated with predetermined user environments; and
    at least one parameter associated with predetermined external devices;
wherein the determination whether the audio signals originate from the user is based on the one or more parameters stored in the memory.

14. The method of claim 10, further comprising:
Converting data received via the wireless connection and/or the control signal into output audio signals; and
emitting, using the output transducer, the output signals comprising audio to the user.

15. The method of claim 14,
wherein the converting of the data received via the wireless connection and/or the control signal into the output audio signals includes performing speech synthesis such that the output audio signals include synthesized speech signals.

16. The method of claim 10, further comprising:
determining, using the signal processor, whether the control signal comprises a predefined control signal; and, in response to determining that the control signal comprises the predefined control signal:
  receiving from the external electronic device, via the second wireless interface and via the second antenna, external audio signals; and
  emitting, using the output transducer, the received external audio signals to the user.

17. The method of claim 10, wherein the hearing device includes at least two input transducers outputting a first audio signal and a second audio signal, the method further comprising:
  comparing the first audio signal and the second audio signal; and
  determining, using the signal processor, whether the audio signals originate from the user based on the comparison of the first audio signal and the second audio signal.

18. The method of claim 10, further comprising:
  determining, using the signal processor, a confidence level based on the audio signals, wherein the confidence level corresponds to a likelihood of the audio signals originating from the user of the hearing aid device; and
  processing, using the signal processing unit, the audio signals according to the confidence level.

19. The method of claim 18, further comprising:
  in response to determining that the confidence level is below a lower threshold confidence level, processing, using the signal processor, the audio signals in accordance with a hearing loss of the user, wherein the processing of the audio signals is in accordance with a hearing aid mode;
  in response to determining that the confidence level is above the lower threshold confidence level, but below a higher threshold confidence level, generating, using the signal processor, the control signal notifying the user by a first notification;
  in response to determining that the confidence level is above the higher threshold confidence level, performing the extraction of the recognized speech signal from the audio signals, and an analysis of the extracted speech signal, by speech recognition.

20. A hearing device comprising:
  an input transducer adapted to receive audio signals;
  an output transducer adapted to emit a signal comprising audio;
  a second antenna;
  a second wireless interface; and
  a signal processing unit;
  wherein the signal processing unit is configured to perform the method of claim 10.

* * * * *